United States Patent
Sundaresh et al.

(10) Patent No.: US 10,579,558 B1
(45) Date of Patent: Mar. 3, 2020

(54) FLEXIBLE REDUNDANT INPUT/OUTPUT (I/O) SCHEMES FOR I/O CHANNELS

(71) Applicant: Honeywell International Inc., Morris Plains, NJ (US)

(72) Inventors: Nagaraja Sundaresh, Hyderabad (IN); Vamsee Krishna Aradhyula, Hyderabad (IN); Ram Mohan Anugu, Hyderabad (IN); Shripad Kumar Pande, Hyderabad (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/293,944

(22) Filed: Mar. 6, 2019

(51) Int. Cl.
| G06F 3/00 | (2006.01) |
| G06F 13/20 | (2006.01) |
| H01R 43/26 | (2006.01) |
| H01R 13/66 | (2006.01) |

(52) U.S. Cl.
CPC ......... *G06F 13/20* (2013.01); *H01R 13/6641* (2013.01); *H01R 43/26* (2013.01); *G06F 2213/40* (2013.01)

(58) Field of Classification Search
CPC . G06F 13/20; G06F 2213/40; H01R 13/6641; H01R 43/26
See application file for complete search history.

(56) References Cited

U.S. PATENT DOCUMENTS

| 6,742,136 B2* | 5/2004 | Christensen | ........ G06F 11/2005 714/5.11 |
| 8,359,112 B2* | 1/2013 | Kephart | .................. G05B 9/03 700/25 |
| 9,053,245 B2* | 6/2015 | Kumar KN | ......... G06F 13/4022 |
| 9,110,838 B2* | 8/2015 | Martin | .................. G06F 13/122 |
| 9,448,952 B2* | 9/2016 | Martin | .................. G06F 13/122 |
| 2002/0184410 A1* | 12/2002 | Apel | ..................... G06F 9/4411 710/5 |
| 2014/0229772 A1* | 8/2014 | Kumar KN | ......... G06F 13/4022 714/48 |
| 2015/0331814 A1* | 11/2015 | Martin | .................. G06F 13/122 710/8 |

OTHER PUBLICATIONS

"ControlEdge 900 Platform Modules Specifications", Honeywell Process Solutions, Sep. 2018, 38 pages.
"General Specifications—Models ANB10S, ANB10D—ESB Bus Node Units (for FIO)", Yokogawa Electric Corp., 2011, 4 pages.
"Technical Information—Integrated Production Control System—Centum VP", Yokogawa Electric Corp., Sep. 2011, 44 pages.
"Technical Data—1715 Redundant I/O System Specifications", Rockwell Automation, Jan. 2017, 22 pages.

* cited by examiner

*Primary Examiner* — Jing-Yih Shyu

(57) ABSTRACT

A redundancy termination panel includes first and second interfaces configured to be coupled to first and second I/O modules, respectively. The redundancy termination panel also includes a third interface configured to be coupled to a field device. The redundancy termination panel further includes an I/O channel circuit associated with an I/O channel between the I/O modules and the field device. The I/O channel circuit is configured to allow an input current used for receiving data from the field device to be split such that different portions of the input current are sourced by different ones of the I/O modules. The I/O channel circuit is also configured to combine multiple currents driven by different ones of the I/O modules and provide an output current used for sending data to the field device.

20 Claims, 24 Drawing Sheets

US 10,579,558 B1

FLEXIBLE REDUNDANT INPUT/OUTPUT (I/O) SCHEMES FOR I/O CHANNELS

TECHNICAL FIELD

This disclosure generally relates to input/output (I/O) systems. More specifically, this disclosure relates to flexible redundant I/O schemes for I/O channels.

BACKGROUND

Industrial process control and automation systems are often used to automate large and complex industrial processes. These types of systems routinely include various components including sensors, actuators, and controllers. Some of the controllers can receive measurements from the sensors, possibly through connected input/output (I/O) subsystems, and generate control signals for the actuators. Existing process control and automation systems typically have hardware components participating in control and I/O functions that are installed in control rooms and in the field. These hardware components are often used to gather I/O information from the field, transmit that I/O information to the control rooms, perform various control functions, and transmit I/O information back to the field.

SUMMARY

This disclosure provides flexible redundant input/output (I/O) schemes for I/O channels.

In a first embodiment, a redundancy termination panel includes first and second interfaces configured to be coupled to first and second I/O modules, respectively. The redundancy termination panel also includes a third interface configured to be coupled to a field device. The redundancy termination panel further includes an I/O channel circuit associated with an I/O channel between the I/O modules and the field device. The I/O channel circuit is configured to allow an input current used for receiving data from the field device to be split such that different portions of the input current are sourced by different ones of the I/O modules. The I/O channel circuit is also configured to combine multiple currents driven by different ones of the I/O modules and provide an output current used for sending data to the field device.

In a second embodiment, a method includes coupling first and second interfaces of a redundancy termination panel to first and second I/O modules, respectively. The method also includes coupling a third interface of the redundancy termination panel to a field device. The method further includes operating an I/O channel circuit associated with an I/O channel between the I/O modules and the field device. The I/O channel circuit is configured to allow an input current used for receiving data from the field device to be split such that different portions of the input current are sourced by different ones of the I/O modules. The I/O channel circuit is also configured to combine multiple currents driven by different ones of the I/O modules and provide an output current used for sending data to the field device.

In a third embodiment, a system includes first and second I/O modules each configured to communicate with one or more field devices over one or more I/O channels. The system also includes a redundancy termination panel that includes first and second interfaces configured to be coupled to the first and second I/O modules, respectively, and a third interface configured to be coupled to the one or more field devices. The redundancy termination panel also includes one or more I/O channel circuits associated with the one or more I/O channels. Each I/O channel circuit is configured to allow an input current used for receiving data from one of the one or more field devices to be split such that different portions of the input current are sourced by different ones of the I/O modules. Each I/O channel circuit is also configured to combine multiple currents driven by different ones of the I/O modules and provide an output current used for sending data to one of the one or more field devices.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
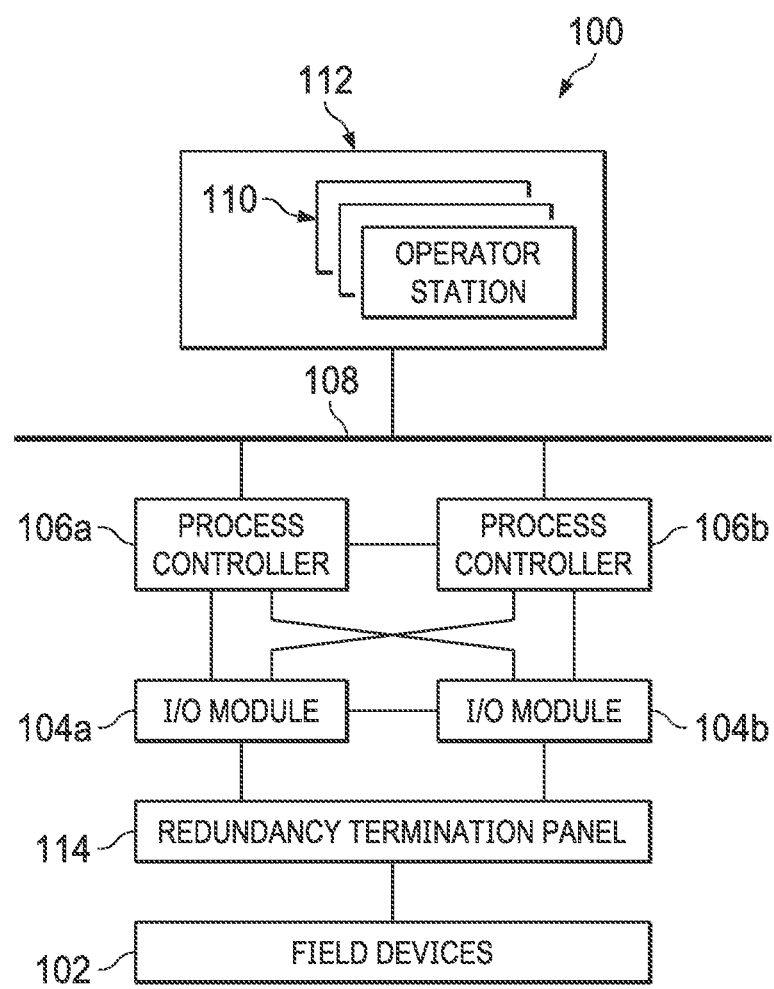
FIG. 1 illustrates an example industrial process control and automation system according to this disclosure.

FIGS. 1 through 24, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, industrial process control and automation systems typically have hardware components participating in various control and input/output (I/O) functions. In many cases, an industrial process controller communicates with one or more field devices (such as one or more sensors or actuators) through one or more I/O modules. The I/O modules typically include circuitry and other components used to facilitate communications with the field devices over specific types of I/O channels.

In various industries and applications, it may be necessary or desirable to support redundant components in a control and automation system or other system. For example, a primary process controller may be associated with a redundant process controller that is ready to take over control operations if the primary process controller fails. The use of redundant components is common in oil and gas refining, pharmaceutical manufacturing, chemical processing, safety shutdown applications, or other applications where redundant components can be used to help ensure that necessary or desired operations occur safely and reliably.

Unfortunately, it may be difficult to provide redundant I/O components in some rack-based control systems or other types of systems. For example, some control systems (such as the CONTROLEDGE system from HONEYWELL INTERNATIONAL INC.) may support a unique arrangement or configuration of I/O channels in rack-based equipment that is optimal for non-redundant operations. Adding I/O redundancy to these or other types of systems can be challenging for various reasons, such as when it is not possible or convenient to provide a common sense resistor or other components between redundant I/O modules. In some instances, adding I/O redundancy may require a complete hardware redesign for I/O channels, racks, or other equipment.

This disclosure describes various approaches for providing I/O redundancy in industrial process control and automation systems or other systems. These approaches support the use of a redundancy termination panel that can be communicatively coupled to one or more field devices and to multiple I/O modules. Among other things, the redundancy termination panel allows an input current used to receive data from a field device to be split among multiple I/O modules, and measurements of portions of the input current by the I/O modules can be summed or otherwise merged or combined to recover the data from the field device. The redundancy termination panel can also merge or combine currents received from different I/O modules to produce an output current used to provide data to a field device. This enables the use of multiple I/O modules in a redundant configuration, possibly along with the use of multiple process controllers in a redundant configuration. If the I/O modules support the use of universal or reconfigurable I/O channels, the redundancy termination panel could support the use of all of the various types of I/O channels supported by the I/O modules.

In this way, redundant I/O communications can be achieved in various process control and automation systems or other systems, including those systems where such redundant communications could not previously be achieved easily, quickly, or cost-effectively. Moreover, one or more redundancy termination panels may allow redundant I/O communications to be achieved in systems that use lower-cost components not designed to be used in a redundant manner (such as CONTROLEDGE system components). Further, the ability of the redundancy termination panel to support the use of universal or reconfigurable I/O channels can help to simplify I/O channel installations and enable changes to be made to existing I/O channel installations more easily. Beyond that, the redundancy termination panel supports mixing redundant and non-redundant I/O channels in the same installation (and possibly within the same equipment rack), which allows for lower overall system costs and reduced physical space. In addition, the use of the redundancy termination panel can help to reduce or eliminate the need to physically redesign hardware components to obtain redundant I/O communications.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control or monitoring of components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials or energy in different forms in some manner.

In the example shown in FIG. 1, the system 100 includes one or more field devices 102. Each field device 102 generally represents a device that provides input data to or receives output data from at least one other component of the system 100. For example, the field devices 102 may include one or more sensors and one or more actuators. The sensors and actuators represent components in a process system that may perform any of a wide variety of functions. For example, the sensors could measure a wide variety of characteristics in the process system, such as temperature, pressure, or flow rate. Also, the actuators could alter a wide variety of characteristics in the process system. Each of the sensors includes any suitable structure for measuring one or more characteristics in a process system. Each of the actuators includes any suitable structure for operating on or affecting one or more conditions in a process system.

Redundant I/O modules 104a-104b are communicatively coupled to the field devices 102. The I/O modules 104a-104b facilitate interactions with sensors, actuators, or other field devices 102. For example, an I/O module 104a-104b could be used to receive one or more analog inputs (AIs), digital inputs (DIs), or other inputs from one or more field devices 102. An I/O module 104a-104b could also be used to provide one or more analog outputs (AOs), digital outputs (DOs), or other outputs to one or more field devices 102. As described below, the interactions with one or more field devices 102 could occur through at least one redundancy termination panel 114. Each I/O module 104a-104b includes any suitable structure(s) for receiving one or more input signals from or providing one or more output signals to one or more field devices 102. In some embodiments, at least some of the I/O channels provided by the I/O modules 104a-104b are sourcing-type I/O channels.

The system 100 also includes one or more controllers 106a-106b. The controllers 106a-106b can be used in the system 100 to perform various functions in order to control one or more industrial processes. For example, the controllers 106a-106b may use measurements from one or more sensors to control the operation of one or more actuators. The controllers 106a-106b could interact with the sensors, actuators, and other field devices 102 via the I/O modules 104a-104b. In some embodiments, the controllers 106a-106b may be arranged in redundant pairs, where one controller in each pair operates in a primary mode and the other controller in that pair operates in a redundant or backup mode (and is ready to take over operation if the primary controller fails).

Each controller 106a-106b includes any suitable structure for controlling one or more aspects of an industrial process. At least some of the controllers 106a-106b could, for example, represent proportional-integral-derivative (PID) controllers or multivariable controllers, such as Robust Multivariable Predictive Control Technology (RMPCT) controllers or other types of controllers implementing model predictive control (MPC) or other advanced predictive control. As a particular example, each controller 106a-106b could represent a computing device running a real-time operating system, a WINDOWS operating system, or other operating system. Note that while shown as separate components here, a controller 106a-106b can often be integrated with one or more I/O modules 104a-104b and other components (like at least one power supply), such as within a single row of an equipment rack. Multiple such instances of integrated components can be placed in the same row of an equipment rack, in different rows of the equipment rack, or in different equipment racks. Of course, components can be integrated and positioned in any other suitable manner.

One or more networks 108 couple the controllers 106a-106b and other devices in the system 100. The network 108 facilitates the transport of information between components. The network 108 could represent any suitable network or combination of networks. As particular examples, the network 108 could represent at least one Ethernet network.

Operator access to and interaction with the controllers 106a-106b and other components of the system 100 can occur via various operator stations 110. Each operator station 110 could be used to provide information to an operator and receive information from an operator. For example, each operator station 110 could provide information identifying a current state of an industrial process to an operator, such as values of various process variables and warnings, alarms, or other states associated with the industrial process. Each operator station 110 could also receive information affecting how the industrial process is controlled, such as by receiving setpoints for process variables controlled by the controllers 106a-106b or other information that alters or affects how the controllers 106a-106b control the industrial process. Each operator station 110 includes any suitable structure for displaying information to and interacting with an operator.

Multiple operator stations 110 can be grouped together and used in one or more control rooms 112. Each control room 112 could include any number of operator stations 110 in any suitable arrangement. In some embodiments, multiple control rooms 112 can be used to control an industrial plant, such as when each control room 112 contains operator stations 110 used to manage a discrete part of the industrial plant.

This represents a brief description of one type of industrial process control and automation system that may be used to manufacture or process one or more materials. Additional details regarding industrial process control and automation systems are well-known in the art and are not needed for an understanding of this disclosure. Also, industrial process control and automation systems are highly configurable and can be configured in any suitable manner according to particular needs.

In particular embodiments, the various I/O modules 104a-104b, controllers 106a-106b, and operator stations 110 in FIG. 1 may represent or include computing or data processing devices. For example, each of the I/O modules, controllers, and operator stations could include one or more processing devices, such as one or more microprocessors, microcontrollers, digital signal processors (DSPs), field programmable gate arrays (FPGAs), application specific integrated circuits (ASICs), or discrete circuitry. Each of the I/O modules, controllers, and operator stations could also include one or more memories storing instructions and data used, generated, or collected by the processing device(s) or the larger device, such as a random access memory, read only memory, Flash memory, optical disc, hard drive, or any other suitable volatile or non-volatile storage device(s). Each of the I/O modules, controllers, and operator stations could further include at least one interface, such as one or more field device protocol interfaces, Ethernet interfaces, or wireless transceivers, that enables communications with other devices or systems.

In process control and automation systems such as the system 100, I/O channels are used to connect the controllers 106a-106b and the field devices 102. In general, the I/O modules 104a-104b or other devices can support I/O channels of various types, including AIs, DIs, AOs, or DOs. Different I/O channel types are characterized by different inputs, outputs, voltages, currents, and configurations. A universal I/O (UIO) channel is a specialized I/O channel that is reconfigurable to operate as any of multiple I/O channel types. Example types of UIO circuits are shown in U.S. Pat. Nos. 8,072,098; 8,392,626; 8,656,065; and U.S. Patent Publication No. 2015/0278144 (all of which are hereby incorporated by reference in their entirety). UIO circuits that support Universal Channel Technology available from HONEYWELL INTERNATIONAL INC. are also suitable for use.

As described in more detail below, at least one redundancy termination panel 114 can be used in the system 100 or other system to support I/O redundancy. For example, each redundancy termination panel 114 allows an input current (such as a current used in an AI or DI I/O channel) to be split among different I/O modules 104a-104b in the absence of any faults in those I/O modules 104a-104b. Portions of the input current can be measured by the I/O modules 104a-104b, and the measurements can be summed or otherwise merged or combined at a controller 106a-106b or other device in order to recover AI or DI input values. If there is a fault in one of the I/O modules 104a-104b, the entire input current can be measured by the non-faulty I/O module 104a or 104b. Thus, the redundancy termination panel 114 supports redundant paths for data carried by the input current to reach at least one controller 106a-106b or other device.

Each redundancy termination panel 114 also allows multiple currents to be generated by different I/O modules 104a-104b and then merged or otherwise combined into a single output current (such as a current used in an AO or DO I/O channel) in the absence of any faults in those I/O modules 104a-104b. The I/O modules 104a-104b can be driven by at least one controller 106a-106b or other device to generate the multiple currents. If there is a fault in one of the I/O modules 104a-104b, the outgoing current can be generated using the non-faulty I/O module 104a or 104b. Again, the redundancy termination panel 114 supports redundant paths for data carried by the output current to reach at least one field device 102 or other device.

Although FIG. 1 illustrates one example of an industrial process control and automation system 100, various changes may be made to FIG. 1. For example, the system 100 could include any number of field devices, I/O modules, controllers, networks, operator stations, redundancy termination panels, and other components in any suitable arrangement. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment in which one or more redundancy termination panels 114 can be used to support redundant I/O communications. This functionality can be used in any other suitable system, and the system need not be related to industrial process control and automation.

Figure 2:
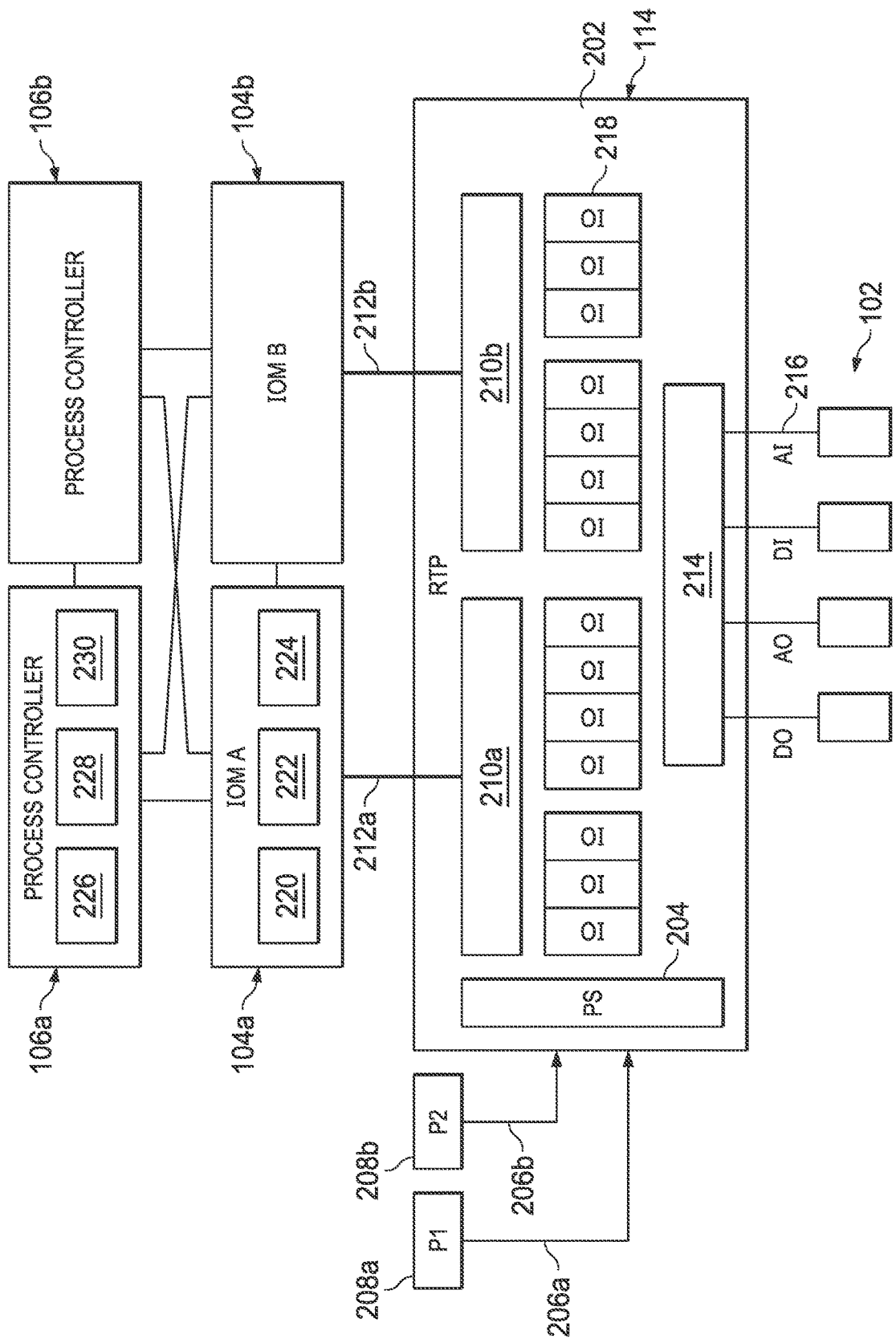
FIGS. 2 and 3 illustrate an example redundancy termination panel for use in an industrial process control and automation system or other system according to this disclosure.
Figure 3:
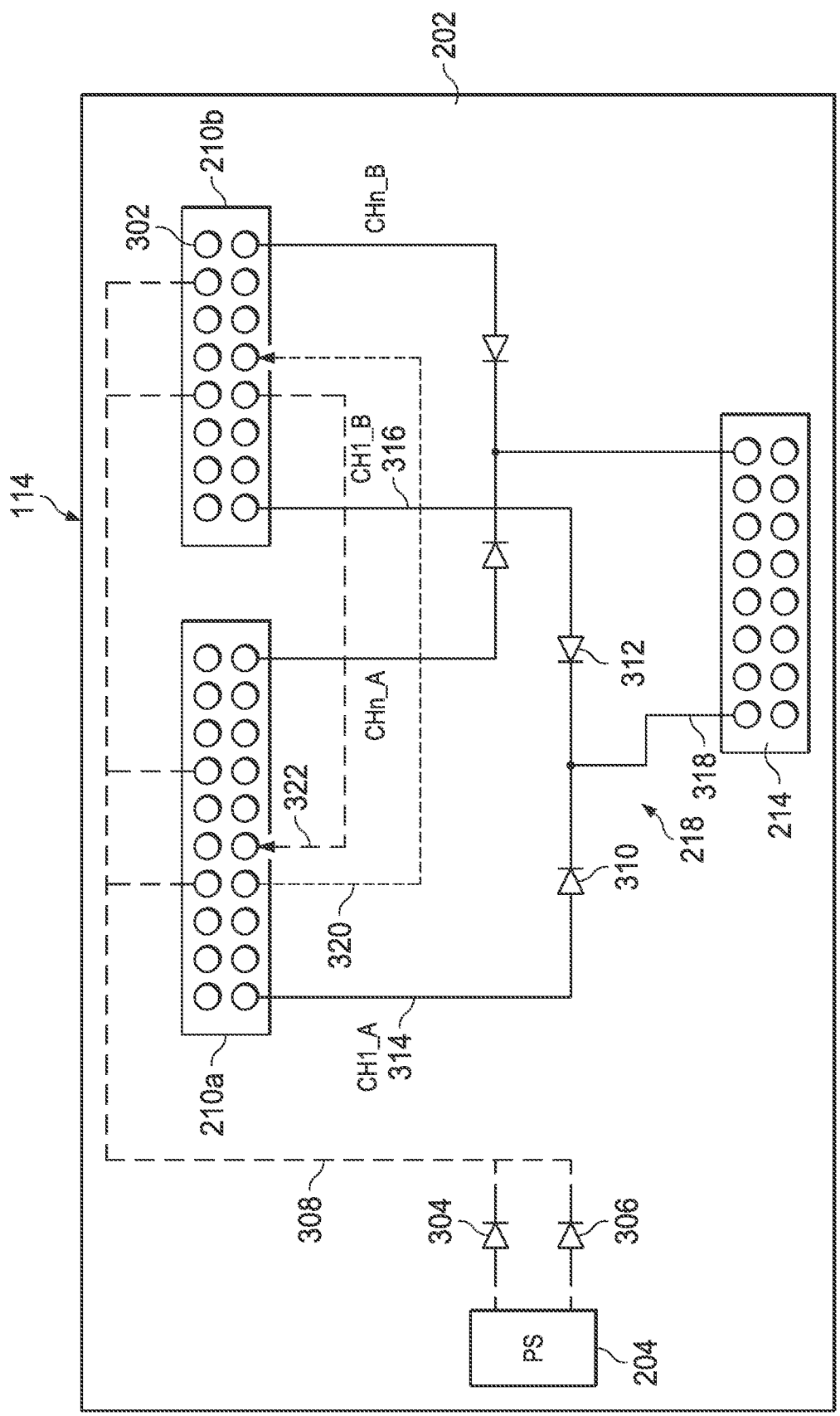

FIGS. 2 and 3 illustrate an example redundancy termination panel 114 for use in an industrial process control and automation system 100 or other system according to this disclosure. For ease of explanation, the redundancy termination panel 114 of FIGS. 2 and 3 may be described as being used in the system 100 of FIG. 1. However, the redundancy termination panel 114 could be used in any other suitable system, regardless of whether or not that system is used for industrial process control and automation.

As shown in FIG. 2, the redundancy termination panel 114 includes a substrate 202, such as a printed circuit board (PCB) or other structure in or on which electrical components and other components can be carried. A power supply (PS) interface 204 is configured to be coupled to at least one electrical conductor 206a-206b in order to couple the redundancy termination panel 114 to at least one power supply 208a-208b. In this example, multiple electrical conductors 206a-206b couple the redundancy termination panel 114 to multiple power supplies 208a-208b, which allows for the use of redundant power sources. However, the use of redundant power supplies 208a-208b is not required, and a single electrical conductor 206a or 206b could be used to couple the redundancy termination panel 114 to a single power supply 208a or 208b. The power supply interface 204 includes any suitable structure configured to receive electrical power from one or more power supplies. Each electrical conductor 206a-206b includes any suitable conductive structure configured to transport electrical power. Each power supply 208a-208b includes any suitable source of electrical power, such as one or more batteries, solar cells, fuel cells, or power converters.

I/O module interfaces 210a-210b are configured to be coupled to multiple I/O modules 104a-104b. For example, each interface 210a-210b may be configured to be coupled to a multi-core cable or other cable 212a-212b that communicatively couples the redundancy termination panel 114 to one of the I/O modules 104a-104b. The I/O module interfaces 210a-210b allow the redundancy termination panel 114 to exchange electrical currents or other signals used in one or more I/O channels with the I/O modules 104a-104b via the cables 212a-212b. Each I/O module interface 210a-210b includes any suitable structure configured to transmit and receive I/O signals to and from an I/O module. Each cable 212a-212b includes any suitable conductive structure configured to transport I/O signals.

At least one field device interface 214 is configured to be coupled to one or more field devices 102. For example, each field device interface 214 may be configured to be coupled to one or more field device connections 216 that communicatively couple the redundancy termination panel 114 to the one or more field devices 102. Each field device interface 214 includes any suitable structure configured to transmit and receive I/O signals to and from at least one field device. Each field device connection 216 includes any suitable conductive structure configured to transport I/O signals.

The redundancy termination panel 114 further includes one or more I/O channel circuits 218. Each I/O channel circuit 218 includes circuit components that facilitate the use of redundant communication pathways for input and output currents. In some embodiments, for example, each of the I/O channel circuits 218 includes various diodes and electrical pathways supporting the use of different types of I/O channels. In particular embodiments, each of the I/O channel circuits 218 supports the use of AI, AO, DI, and DO I/O channels, which allows use of the redundancy termination panel 114 with universal or reconfigurable I/O channels in the I/O modules 104a-104b.

In some embodiments, each of the I/O modules 104a-104b may include at least one processing device 220, at least one memory 222, and at least one interface 224. Each processing device 220 includes any suitable data processing device, such as a microprocessor, microcontroller, DSP, FPGA, ASIC, or discrete circuitry. Each memory 222 includes any suitable volatile or non-volatile storage device, such as a random access memory, read only memory, Flash memory, optical disc, or hard drive, which could be used to store instructions and data used, generated, or collected by the processing device(s) 220 or the I/O module 104a-104b. Each interface 224 includes any suitable structure configured to communicate with one or more field devices 102, controllers 106a-106b, or other devices. In some embodiments, an interface 224 used to communicate with field devices 102 includes transistor switches that can be used to selectively activate or deactivate individual I/O channels, as well as one or more secondary means of de-energization (SMODs) that can be used to deactivate those I/O channels.

Also, in some embodiments, each of the controllers 106a-106b may include at least one processing device 226, at least one memory 228, and at least one interface 230. Each processing device 226 includes any suitable data processing device, such as a microprocessor, microcontroller, DSP, FPGA, ASIC, or discrete circuitry. Each memory 228 includes any suitable volatile or non-volatile storage device, such as a random access memory, read only memory, Flash memory, optical disc, or hard drive, which could be used to store instructions and data used, generated, or collected by the processing device(s) 226 or the controller 106a-106b. Each interface 230 includes any suitable structure configured to communicate with one or more I/O modules 104a-104b or other devices.

FIG. 3 illustrates additional components that may be used in the redundancy termination panel 114. As shown in FIG. 3, each of the interfaces 210a-210b and 214 includes various connectors 302. Each connector 302 represents a structure that can be coupled to a signal conductor, such as in a cable 212a-212b or field device connection 216. Each connector 302 can also be coupled to at least one signal line or other electrical pathway within the redundancy termination panel 114.

Diodes 304 and 306 and various electrical pathways 308 electrically couple the power supply interface 204 to the I/O module interfaces 210a-210b. The diodes 304 and 306 help to ensure that electrical energy flows in a desired direction from at least one power supply 208a-208b. Note that two diodes 304 and 306 are shown here since two power supplies 208a-208b may be coupled to the power supply interface 204. However, other numbers of diodes could be used here, such as a single diode 304 or 306 when a single power supply 208a or 208b is coupled to the power supply interface 204. Each of the diodes 304 and 306 includes any suitable diode configured to limit the direction of electrical energy flow. Each electrical pathway 308 includes any suitable conductive structure configured to transport electrical energy, such as a conductive trace on a printed circuit board.

Each I/O channel circuit 218 in this example embodiment is implemented using diodes 310 and 312 and electrical pathways 314, 316, and 318. The electrical pathway 314 couples one of the connectors 302 of the I/O module interface 210a to the anode of the diode 310, and the electrical pathway 316 couples one of the connectors 302 of the other I/O module interface 210b to the anode of the diode 312. The electrical pathway 318 couples the cathodes of the diodes 310 and 312 to one of the connectors 302 of the field device interface 214. The diodes 310 and 312 can be used as described below to allow an input current to be split or to combine output currents. This same overall arrangement can be used for each I/O channel passing through the redundancy termination panel 114. While components for two I/O channel circuits 218 are shown in FIG. 3, the I/O channel circuit 218 shown in FIG. 3 can be replicated for up to a given number n of I/O channels, or a single I/O channel circuit 218 may be used (depending on the implementation).

Each of the diodes 310 and 312 includes any suitable diode configured to limit the direction of electrical energy flow, such as a normal diode or a Zener diode. Note that while a single diode 310 and a single diode 312 are shown in FIG. 3, the diode 310 could be replaced by a string of diodes 310 coupled in series, and the diode 312 could be replaced by a string of diodes 312 coupled in series. In those embodiments, a first of the diodes 310 would have its anode coupled to one of the connectors 302 of the I/O module interface 210a, and a last of the diodes 310 would have its cathode coupled to one of the connectors 302 of the field device interface 214. Also, a first of the diodes 312 would have its anode coupled to one of the connectors 302 of the I/O module interface 210b, and a last of the diodes 312 would have its cathode coupled to one of the connectors 302 of the field device interface 214. Each of the electrical pathways 314, 316, and 318 includes any suitable conductive structure configured to transport at least a portion of an I/O signal, such as a conductive trace on a printed circuit board.

One or more additional electrical pathways 320 and 322 may be used to couple one or more connectors 302 of the I/O module interface 210a to one or more connectors 302 of the I/O module interface 210b. The electrical pathways 320 and 322 can be used to support the communication of information or signaling between the I/O modules 104a-104b. For example, the electrical pathway 320 can be used to transport data or other signals from the I/O module 104a to the I/O module 104b, and the electrical pathway 322 can be used to transport data or other signals from the I/O module 104b to the I/O module 104a. Of course, the I/O modules 104a-104b may communicate in other ways, such as via one or more dedicated connections between the I/O modules 104a-104b or through one or more of the controllers 106a-106b, in which case the electrical pathways 320 and 322 can be omitted. Each of the electrical pathways 320 and 322 includes any suitable conductive structure configured to transport a signal, such as a conductive trace on a printed circuit board.

Although FIGS. 2 and 3 illustrate one example of a redundancy termination panel 114 for use in an industrial process control and automation system 100 or other system, various changes may be made to FIGS. 2 and 3. For example, various components in FIGS. 2 and 3 could be combined, further subdivided, omitted, or rearranged and additional components could be added according to particular needs. Also, the form factors for the redundancy termination panel 114 and its components and the layout of the components are for illustration only.

Figure 4:
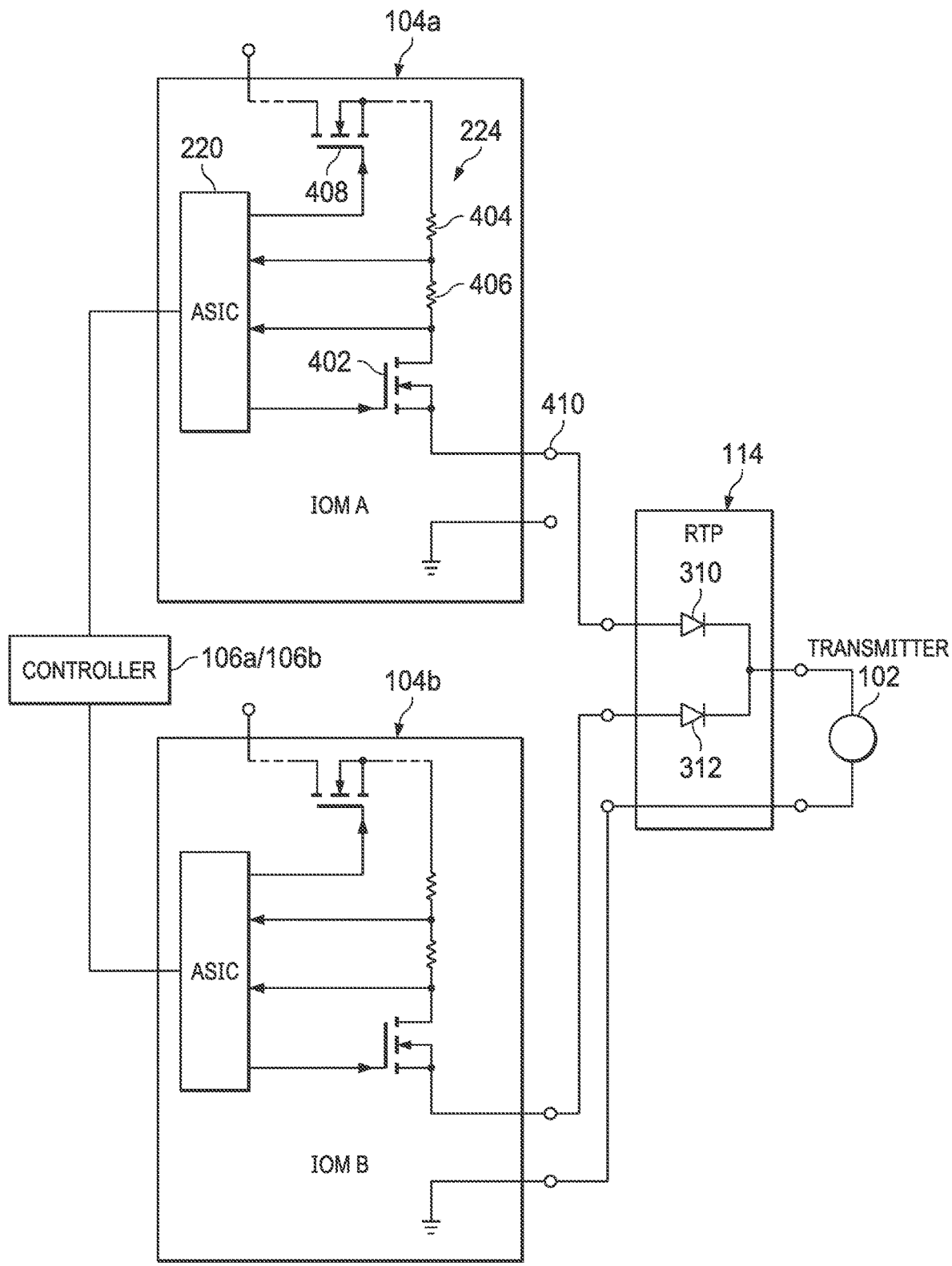
FIGS. 4 and 5 illustrate example uses of a redundancy termination panel according to this disclosure.
Figure 5:
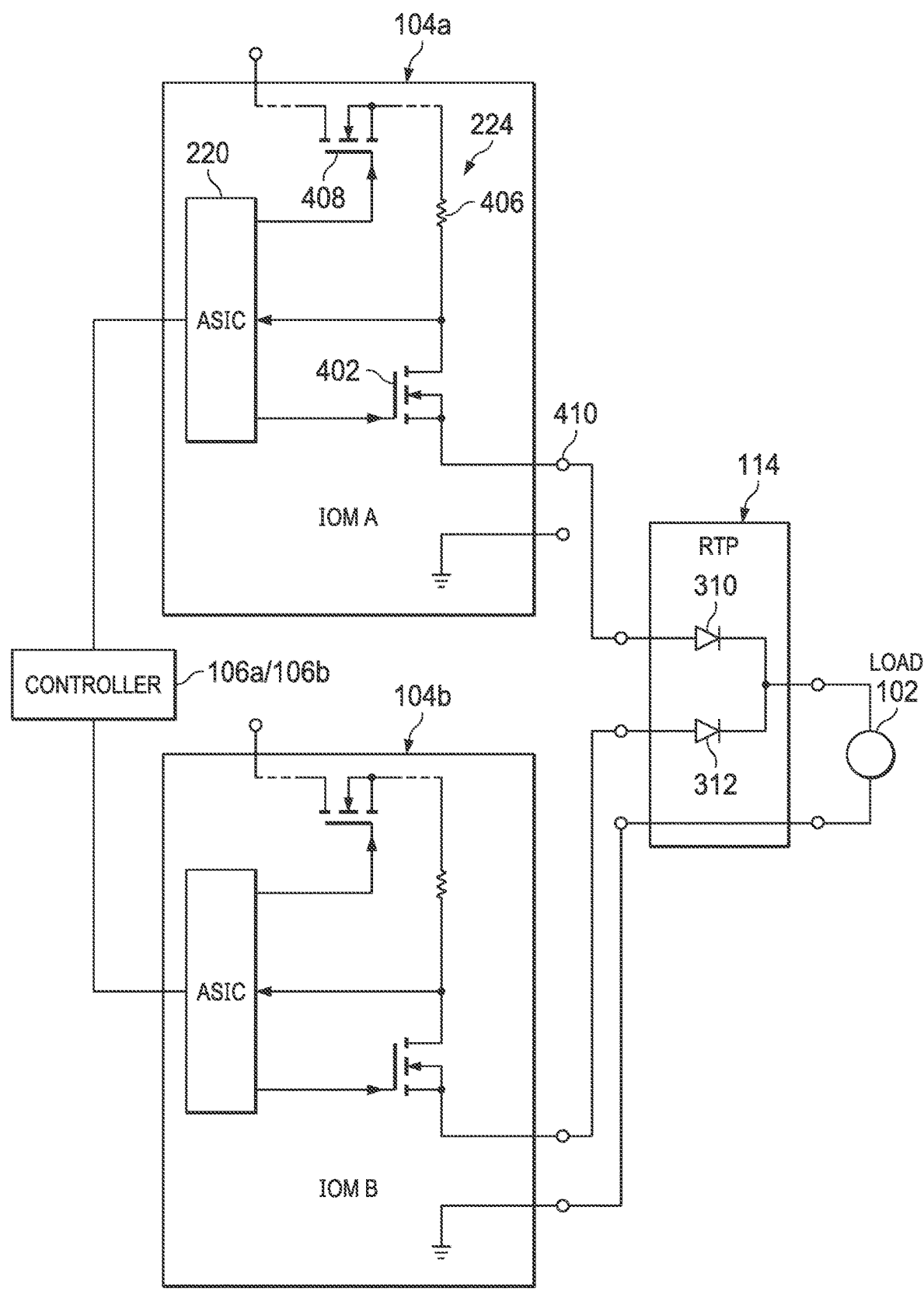

FIGS. 4 and 5 illustrate example uses of a redundancy termination panel 114 according to this disclosure. In particular, FIG. 4 illustrates an example use of the redundancy termination panel 114 with an analog input or digital input I/O channel, and FIG. 5 illustrates an example use of the redundancy termination panel 114 with an analog output or digital output I/O channel. For ease of explanation, the redundancy termination panel 114 shown in FIGS. 4 and 5 may be described as being used in the system 100 of FIG. 1. However, the redundancy termination panel 114 could be used in any other suitable system, regardless of whether or not that system is used for industrial process control and automation.

As shown in FIG. 4, each of the I/O modules 104a-104b includes the at least one processing device 220, which in this example is implemented using an ASIC (although other implementations could be used). Each of the I/O modules 104a-104b also includes a switch 402 coupled in series with a resistor 404 and a sense resistor 406, and these components can be replicated for each I/O channel supported by the I/O module. The switch 402 is configured to be selectively activated (made conductive) and deactivated (made nonconductive) in order to control a flow of electrical current through the resistors 404 and 406. The switch 402 includes any suitable structure configured to selectively allow and block an electrical current flow, such as a PNP-type or other transistor. Each resistor 404 and 406 includes any suitable resistive structure having any suitable resistance. In some embodiments, the resistor 404 has an adequately large resistance to limit the amount of total current that can flow through the switch 402. Also, the resistor 406 typically has a suitably small resistance that allows the processing device 220 to accurately measure current flowing through the resistor 406 based on a voltage drop across the resistor 406.

Each of the I/O modules 104a-104b further includes at least one secondary means of de-energization (SMOD) switch 408. Each SMOD switch 408 is coupled in series with one or more of the I/O channels and can be used to activate or deactivate those I/O channels. In some embodiments, each I/O channel can have its own dedicated SMOD switch 408. In other embodiments, multiple I/O channels can be coupled to a common SMOD switch 408. Each SMOD switch 408 includes any suitable structure configured to selectively allow and block an electrical current flow, such as a PNP-type or other transistor.

In addition, each of the I/O modules 104a-104b includes two output terminals 410. In the illustrated examples, a first output terminal 410 of the I/O module 104a is coupled to the diode 310 in one I/O channel circuit 218 of the redundancy termination panel 114. Also, a first output terminal 410 of the I/O module 104b is coupled to the diode 312 in the I/O channel circuit 218 of the redundancy termination panel 114. The diodes 310 and 312 are coupled to a first terminal of a field device 102. A second output terminal 410 of the I/O module 104a is coupled to ground. A second output terminal 410 of the I/O module 104b is coupled to ground and optionally to a second terminal of the field device 102.

In the configuration shown in FIG. 4, an analog input or digital input I/O channel is being used. In this arrangement, the I/O modules 104a-104b can implement a "sourcing-type" AI or DI I/O channel, meaning the I/O modules 104a-104b provide electrical current to a field device 102. During normal operation when used with an analog input I/O channel, an input current is driven (sourced) by the I/O modules 104a-104b to the field device 102, and the field device 102 can alter its resistance or other characteristic(s) to vary the currents drawn from the I/O modules 104a-104b in order to represent an analog value. These currents can be measured at the I/O modules 104a-104b (via their sense resistors 406). At least one controller 106a-106b can receive current measurements from the I/O modules 104a-104b and sum the measurements to recover values for the AI I/O channel. During normal operation when used with a digital input I/O channel, an input current is driven (sourced) by the I/O modules 104a-104b to the field device 102, and the field device 102 can alter its resistance or other characteristic(s) to vary the currents drawn from the I/O modules 104a-104b in order to represent a digital value (also called a digital state). These currents can be measured at the I/O modules 104a-104b (via their sense resistors 406) and used to identify digital input states. At least one controller 106a-106b can logically "OR" the identified digital input states to recover values for the DI I/O channel. In this way, the redundancy termination panel 114 allows an AI or DI input current to be split among multiple I/O modules 104a-104b, and one or more controllers 106a-106b can recover AI or DI input values based on measurements made by the I/O modules 104a-104b.

If one of the I/O modules 104a-104b fails, the faulty I/O module 104a-104b can stop driving current to the field device 102. As a result, the controller 106a-106b can use the current or digital input state as determined by the remaining I/O module 104a-104b to recover AI or DI input values. As described below, a debounce algorithm or other algorithm could be supported in the I/O modules 104a-104b or the controllers 106a-106b to suppress rapid changes in AI or DI input values caused by an I/O module failure, at least until some period of time has elapsed.

In the configuration shown in FIG. 5, an analog output or digital output I/O channel is being used. In this arrangement, the I/O modules 104a-104b can implement a "sourcing-type" analog output or digital output I/O channel, and the resistors 404 may not be needed in the I/O modules 104a-104b. During normal operation when used with an analog output I/O channel, different I/O modules 104a-104b drive portions (such as half) of an output current to the redundancy termination panel 114, and the redundancy termination panel 114 combines the portions to provide a desired analog output current to the field device 102. During normal operation when used with a digital output I/O channel, different I/O modules 104a-104b drive digital output signals, and the redundancy termination panel 114 can logically "OR" the digital output signals to provide a desired digital output signal to the field device 102. In some embodiments, each I/O module 104a-104b can communicate with the other I/O module 104a-104b in order to identify the other I/O module's status. Each I/O module 104a-104b can then determine whether to output an entire current signal or a portion of a current signal based on whether the other I/O module 104a-104b is operating properly.

If one of the I/O modules 104a-104b fails, the controller 106a-106b can stop driving the faulty I/O module 104a-104b and use only the remaining I/O module 104a-104b to drive an AO or DO output current. Again, as described below, a debounce algorithm or other algorithm could be supported in the I/O modules 104a-104b or the controller 106a-106b to suppress rapid changes in AO or DO output values caused by an I/O module failure, at least until some period of time has elapsed.

Although FIGS. 4 and 5 illustrate example uses of a redundancy termination panel 114, various changes may be made to FIGS. 4 and 5. For example, the components 402, 404, 406, and 408 could be replicated any number of times within an I/O module 104a-104b to provide a desired number of I/O channels in the I/O module 104a-104b. Similarly, the diodes 310 and 312 (and the associated electrical pathways 314, 316, and 318 described above) could be replicated any number of times within a redundancy termination panel 114 to provide a desired number of I/O channels in the redundancy termination panel 114. Also, while the use of two redundant I/O modules 104a-104b is shown here, it is possible to support more than two I/O modules 104a-104b if needed or desired.

Figure 6:
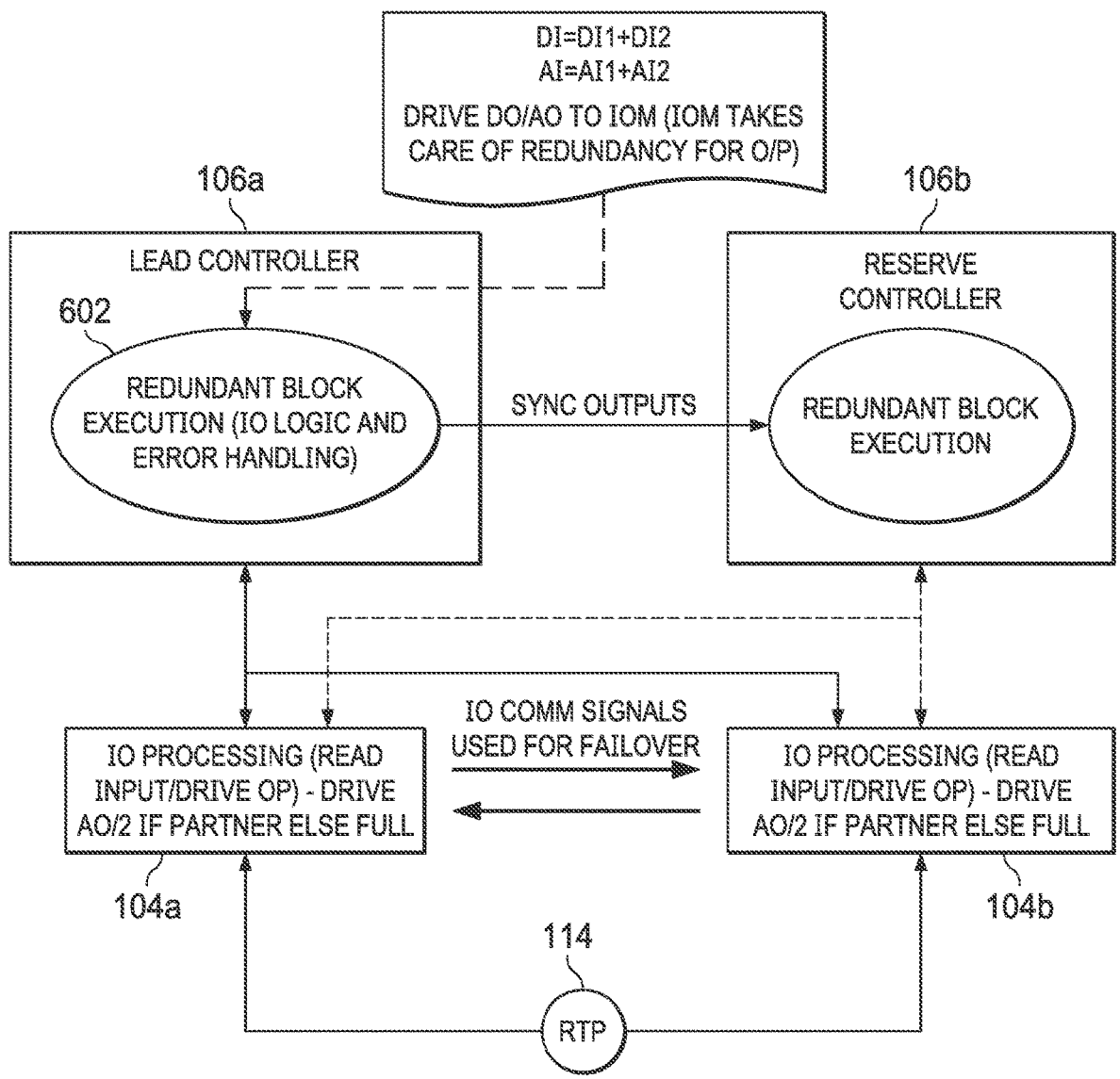
FIG. 6 illustrates example functions performed to support the use of a redundancy termination panel according to this disclosure.

FIG. 6 illustrates example functions performed to support the use of a redundancy termination panel 114 according to this disclosure. In particular, FIG. 6 illustrates example functions that can be performed by the controllers 106a-106b and the I/O modules 104a-104b to support the use of the redundancy termination panel 114 with different types of I/O channels (namely AI, AO, DI, and DO channels). However, the redundancy termination panel 114 could be used with any other suitable components and in any other suitable systems, regardless of whether or not those components or systems are used for industrial process control and automation.

As shown in FIG. 6, each controller 106a-106b is configured to execute a redundant function block 602 to support functions such as I/O logic and error handling. For example, when used with a digital input I/O channel, the redundant function block 602 can be used to digitally sum or logically "OR" values DI1 and DI2 measured by the I/O modules 104a-104b (based on currents flowing through their sense resistors 406) to generate a final digital input value DI during normal operation. When used with an analog input I/O channel, the redundant function block 602 can be used to sum values AI1 and AI2 measured by the I/O modules 104a-104b (based on currents flowing through their sense resistors 406) to generate a final analog input value AI during normal operation. If one of the I/O modules 104a-104b fails, the redundant function block 602 can use the current value or digital state as measured by the remaining I/O module 104a-104b (based on a current flowing through its sense resistor 406) to generate a final digital input or analog input value. When used with an analog output or digital output I/O channel, the redundant function block 602 can be used to drive an AO or DO value to the I/O modules 104a-104b. The I/O modules 104a-104b can generate the appropriate output signal(s), which may be combined by the redundancy termination panel 114 (if multiple I/O modules 104a-104b generate multiple signals).

Each of the I/O modules 104a-104b can perform I/O processing to support the use of various types of I/O channels. For example, when used with a digital input or analog input I/O channel, each I/O module 104a-104b can measure its current (such as by using its sense resistor 406) and generate a value (such as a current measurement or digital state) that is provided to the controller 106a-106b.

The I/O modules 104a-104b here may be unaware of whether they are receiving an entire AI or DI input signal or only a portion of an AI or DI input signal. When used with a digital output I/O channel, each I/O module 104a-104b can drive a suitable output representing a desired digital value, and the redundancy termination panel 114 can combine the outputs (such as by performing a logical "OR") to produce a desired digital output value. The I/O modules 104a-104b here may be unaware of whether they are solely or collectively generating a DO output signal. When used with an analog output I/O channel, each I/O module 104a-104b can drive either an entire AO output current or a portion of an AO output current, depending on the status of the other I/O module 104a-104b. As noted above, the I/O modules 104a-104b may communicate via the electrical pathways 320 and 322 of the redundancy termination panel 114, via the controller(s) 106a-106b, or in any other suitable manner.

In FIG. 6, any suitable approach can be used to manage redundancy between the I/O modules 104a-104b. For example, each I/O module 104a-104b may be configured to transmit a normally-high digital signal or other signal to the other I/O module 104a-104b. One I/O module 104a-104b may therefore identify a failure of the other I/O module 104a-104b, such as when the digital signal goes low (at least for a specified number of intervals or a specified amount of time). Similarly, any suitable approach can be used to manage redundancy between the controllers 106a-106b. Also, the redundant function blocks 602 in the controllers 106a-106b can be used to support various functions, such as process variable calculations (like identifying AI or DI input values), output driving (like providing AO or DO output values), and diagnostics (like identifying open-circuit, short-circuit, or other conditions). Other functions can include synchronization of data with the other controller 106a-106b, timing control, and bumpless transfers of I/O data.

Although FIG. 6 illustrates examples of functions performed to support the use of a redundancy termination panel 114, various changes may be made to FIG. 6. For example, the redundancy termination panel 114 may be used with redundant I/O modules 104a-104b and a single controller 106a or 106b. Also, the redundancy termination panel 114 may be used with any other suitable components that support one or more I/O channels in any other suitable system.

FIGS. 7 through 24 illustrate example methods and communication flows involving a redundancy termination panel or components used in conjunction with a redundancy termination panel (such as one or more I/O modules 104a-104b or one or more controllers 106a-106b). For ease of explanation, the methods and communication flows in FIGS. 7 through 24 may be described as involving the use of the redundancy termination panel 114, I/O modules 104a-104b, and controllers 106a-106b of FIGS. 2 and 3 in the system 100 of FIG. 1. However, the methods and communication flows in FIGS. 7 through 24 could involve the use of any other suitable components in any other suitable systems, regardless of whether or not those components or systems are used for industrial process control and automation.

Figure 7:
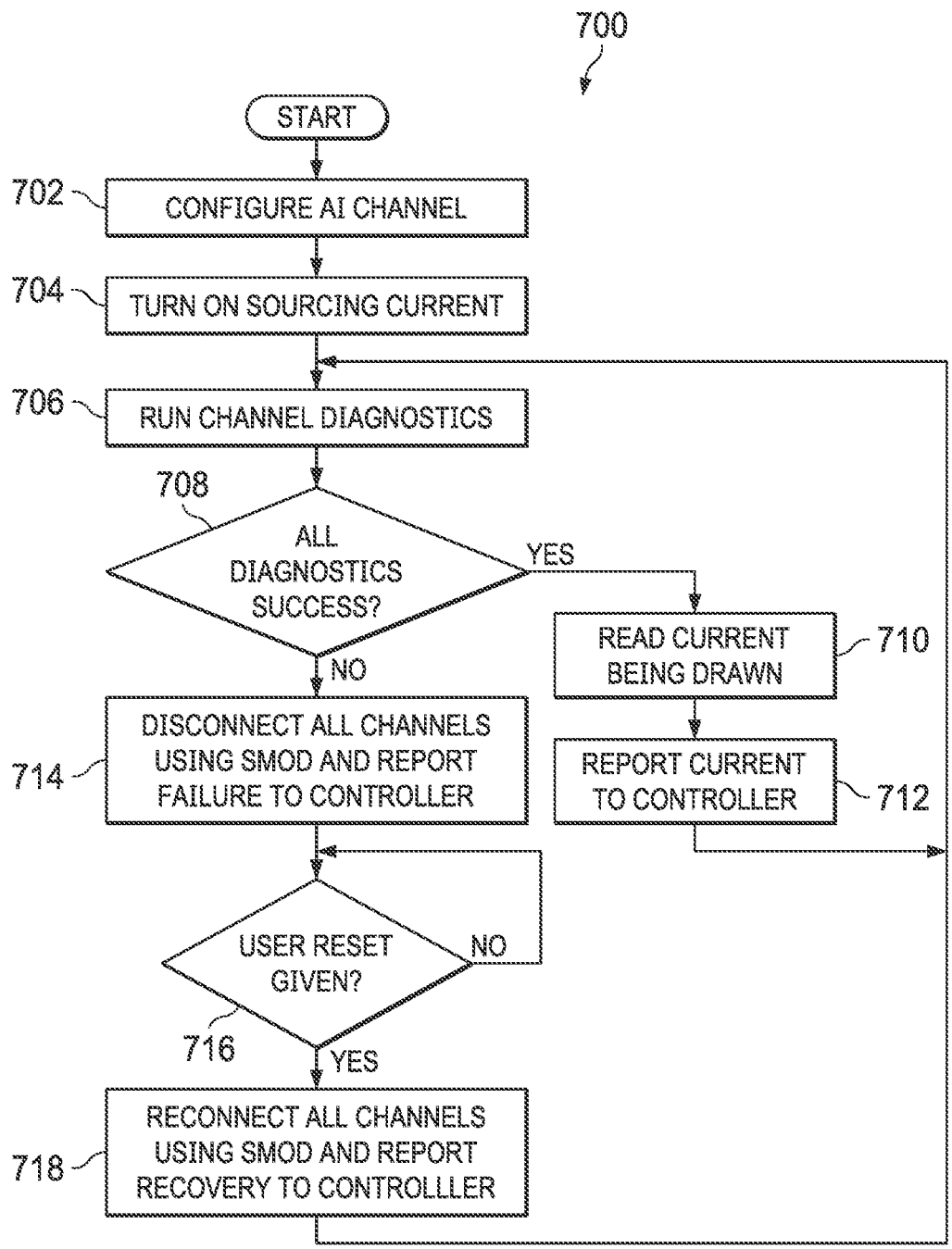
FIG. 7 illustrates an example method for supporting the use of a redundancy termination panel with an analog input I/O channel according to this disclosure.

FIG. 7 illustrates an example method 700 for supporting the use of a redundancy termination panel 114 with an analog input I/O channel according to this disclosure. In particular, the method 700 can be performed by each of multiple I/O modules 104a-104b to support the use of a redundant AI channel through a redundancy termination panel 114. As shown in FIG. 7, an AI channel is configured at step 702. This can include, for example, an I/O module 104a-104b configuring a universal or reconfigurable I/O channel as an analog input channel. Alternatively, this can include personnel installing circuitry supporting an analog input channel into the I/O module 104a-104b.

Sourcing current is turned on for the AI channel at step 704. This can include, for example, the I/O module 104a-104b activating the switch 402 for the AI channel in order to allow current to flow through the AI channel. If not already activated, this can also include the I/O module 104a-104b activating the SMOD switch 408 for that channel. One or more channel diagnostics are run at step 706. This can include, for example, the I/O module 104a-104b measuring the current flowing through the switch 402 based on measurements captured using the sense resistor 406. This can also include the I/O module 104a-104b determining whether one or more conditions are detected, such as whether the measured current is indicative of a short-circuit or open-circuit condition.

A determination is made whether all diagnostics were successful at step 708. If so, the AI channel can be placed into normal use. During this time, current being drawn through the AI channel is read (measured) at step 710, and the read current is reported to at least one controller at step 712. This can include, for example, the I/O module 104a-104b measuring the current flowing through the switch 402 based on measurements captured using the sense resistor 406. This can also include the I/O module 104a-104b reporting its current measurements to one or more controllers 106a-106b. As noted above, during this time, the controller(s) 106a-106b can combine current measurements from multiple I/O modules 104a-104b to recover AI input values being sent by a field device 102. The steps 706-712 can be repeated any number of times here.

If not all diagnostics are successful at step 708, all channels of the I/O module can be disconnected and a failure can be reported to at least one controller at step 714. This can include, for example, the I/O module 104a-104b deactivating its SMOD switches 408 for all channels (possibly including a channel used to communicate its status to another I/O module 104a-104b). This can also include the I/O module 104a-104b sending an alert or other indicator identifying the failure to one or more controllers 106a-106b. As noted above, during this time, the controller(s) 106a-106b can use measurements from any remaining (non-faulty) I/O modules 104a-104b to recover AI input values being sent by a field device 102. Note that the I/O module 104a-104b may first go through a debounce process before concluding that an actual failure has occurred. A determination is made whether a user reset (or other reset indicator) has been given for the faulty I/O module at step 716. If so, the channels of the (now restored) I/O module can be reconnected and a recovery can be reported to at least one controller at step 718. This can include, for example, the restored I/O module 104a-104b activating its SMOD switches 408 for all channels. This can also include the I/O module 104a-104b sending an alert or other indicator identifying the recovery to one or more controllers 106a-106b. At this point, the I/O module 104a-104b can return to step 706.

Figure 8:
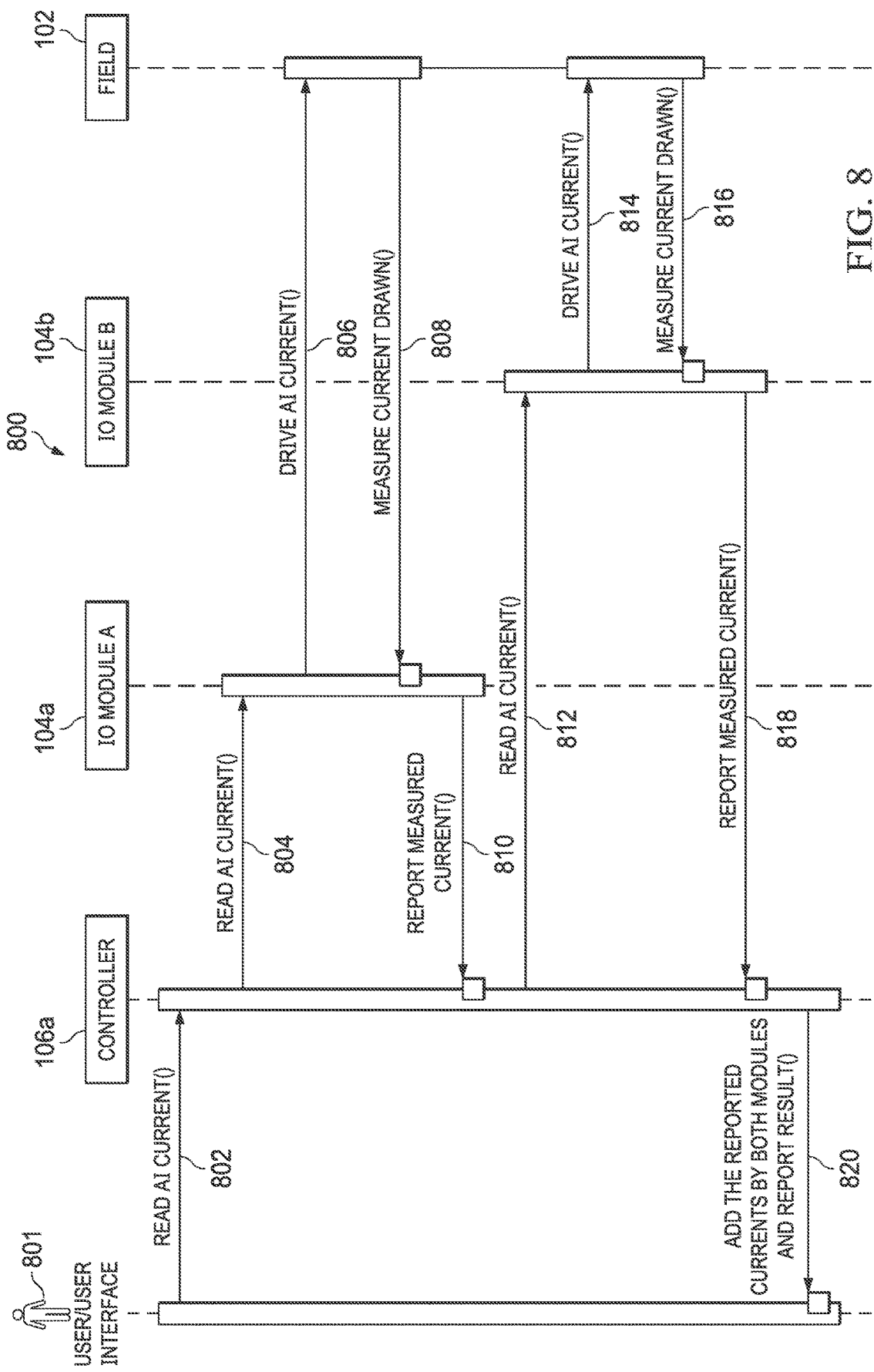
FIGS. 8 through 10 illustrate example communication flows when using a redundancy termination panel with an analog input I/O channel according to this disclosure.
Figure 9:
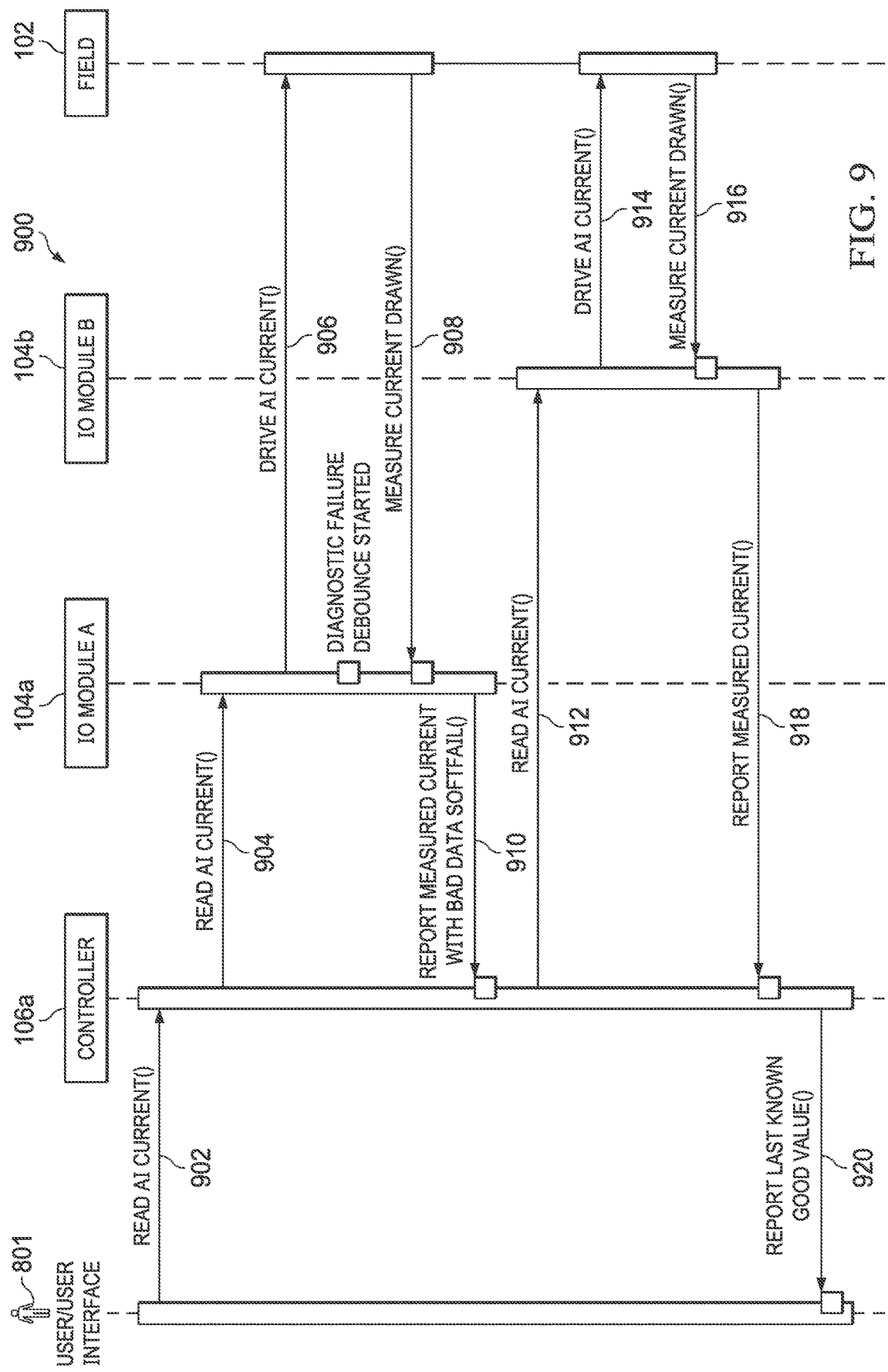
Figure 10:
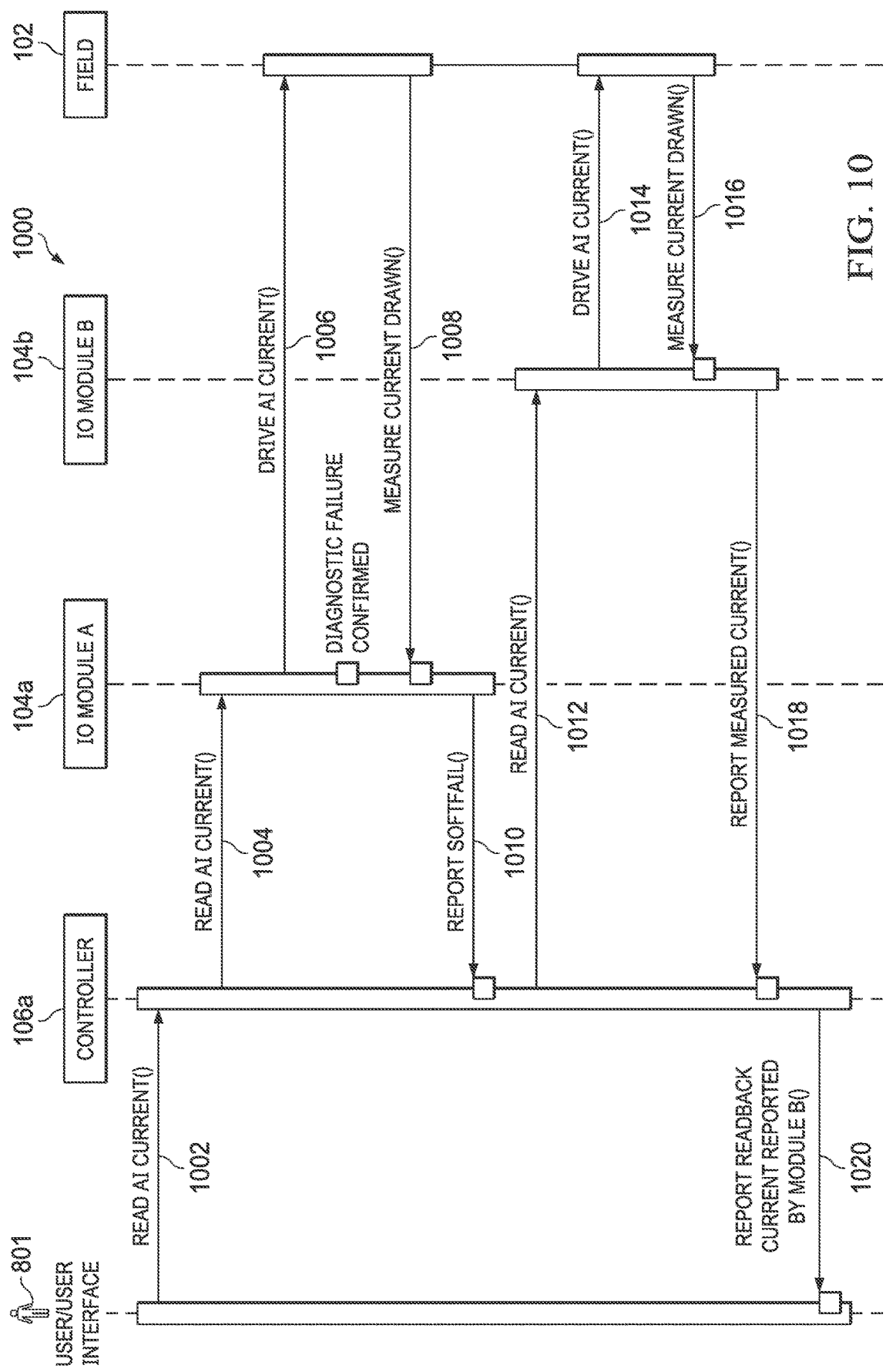

FIGS. 8 through 10 illustrate example communication flows when using a redundancy termination panel 114 with an analog input I/O channel according to this disclosure. In particular, FIG. 8 illustrates an example communication flow 800 during normal operation of an analog input channel, FIG. 9 illustrates an example communication flow 900 during a debounce after a potential failure of the analog input channel, and FIG. 10 illustrates an example communication flow 1000 after debouncing and after a confirmed failure of the analog input channel.

As shown in FIG. 8, during normal operation of an analog input channel, a user/user interface 801 sends a request 802 to read a current for the AI channel to at least one controller (such as the controller 106*a*). In response, the controller 106*a* sends a command 804 to read the current for the AI channel to the I/O module 104*a*, causing the I/O module 104*a* to drive a current 806 to the field device 102. The I/O module 104*a* captures a measurement 808 of the current drawn by the field device 102 and sends a response 810 containing the measurement to the controller 106*a*. The controller 106*a* also sends a command 812 to read a current for the AI channel to the I/O module 104*b*, causing the I/O module 104*b* to drive a current 814 to the field device 102. The I/O module 104*b* captures a measurement 816 of the current drawn by the field device 102 and sends a response 818 containing the measurement to the controller 106*a*. The controller 106*a* sums the two current measurements reported by the I/O modules 104*a*-104*b* and sends a response 820 containing the resulting sum to the user/user interface 801.

As shown in FIG. 9, the user/user interface 801 sends a request 902 to read a current for the AI channel to at least one controller (such as the controller 106*a*). In response, the controller 106*a* sends a command 904 to read the current for the AI channel to the I/O module 104*a*, causing the I/O module 104*a* to drive a current 906 to the field device 102. In this case, however, an initial diagnostic failure occurs, meaning the I/O module 104*a* may or may not be able to obtain a valid measurement. Thus, the I/O module 104*a* captures a measurement 908 of the current drawn by the field device 102 and sends a response 910 containing the measurement and a "bad data softfail" indicator to the controller 106*a*. The "bad data softfail" indicator informs the controller 106*a* that a potential failure has been detected, so the I/O module 104*a* is entering a debounce period in which a specified amount of time needs to elapse before the I/O module 104*a* can determine whether an actual failure has occurred. The controller 106*a* also sends a command 912 to read the current for the AI channel to the I/O module 104*b*, causing the I/O module 104*b* to drive a current 914 to the field device 102. The I/O module 104*b* captures a measurement 916 of the current drawn by the field device 102 and sends a response 918 containing the measurement to the controller 106*a*. The controller 106*a* sends a response 920 containing the last known good AI value to the user/user interface 801, which helps to prevent a possibly-invalid AI value from being provided to the user/user interface 801.

As shown in FIG. 10, the user/user interface 801 sends a request 1002 to read a current for the AI channel to at least one controller (such as the controller 106*a*). In response, the controller 106*a* sends a command 1004 to read the current for the AI channel to the I/O module 104*a*, causing the I/O module 104*a* to drive a current 1006 to the field device 102. In this case, however, the diagnostic failure is confirmed, meaning the I/O module 104*a* (which previously detected a potential error and started debouncing as shown in FIG. 9) has confirmed that a failure exists. Thus, the I/O module 104*a* captures a measurement 1008 of the current drawn by the field device 102 and sends a response 1010 reporting a "softfail" to the controller 106*a*. The softfail indicator informs the controller 106*a* that the I/O module 104*a* has failed. The controller 106*a* also sends a command 1012 to read the current for the AI channel to the I/O module 104*b*, causing the I/O module 104*b* to drive a current 1014 to the field device 102. The I/O module 104*b* captures a measurement 1016 of the current drawn by the field device 102 and sends a response 1018 containing the measurement to the controller 106*a*. The controller 106*a* uses the current measurement reported by the I/O module 104*b* and sends a response 1020 containing the measured value to the user/user interface 801.

Figure 11:
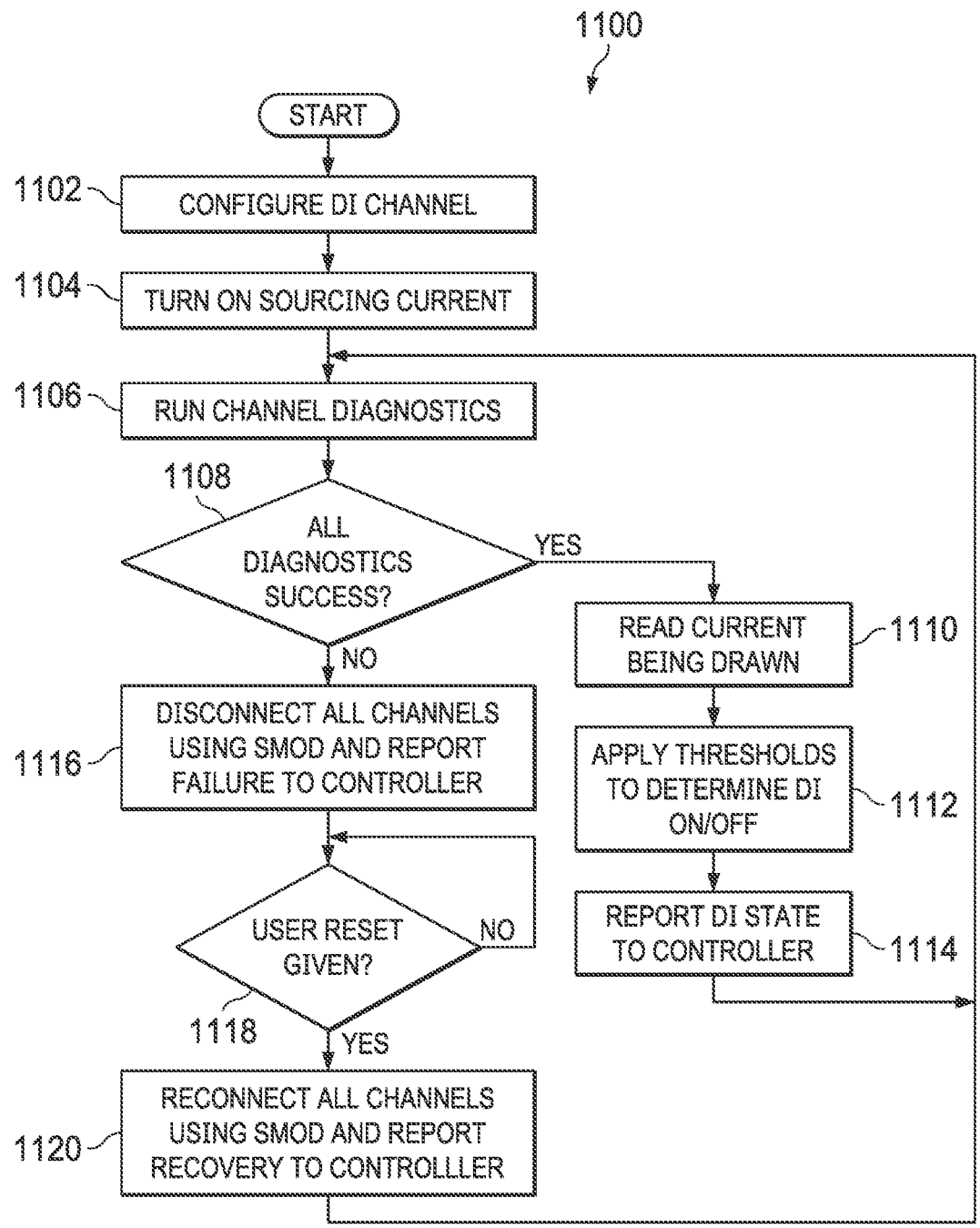
FIG. 11 illustrates an example method for supporting the use of a redundancy termination panel with a digital input I/O channel according to this disclosure.

FIG. 11 illustrates an example method 1100 for using a redundancy termination panel 114 with a digital input I/O channel according to this disclosure. In particular, the method 1100 can be performed by each of multiple I/O modules 104*a*-104*b* to support the use of a redundant DI channel through a redundancy termination panel 114. As shown in FIG. 11, a DI channel is configured at step 1102. This can include, for example, an I/O module 104*a*-104*b* configuring a universal or reconfigurable I/O channel as a digital input channel. Alternatively, this can include personnel installing circuitry supporting a digital input channel into the I/O module 104*a*-104*b*.

Sourcing current is turned on for the DI channel at step 1104. This can include, for example, the I/O module 104*a*-104*b* activating the switch 402 for the DI channel in order to allow current to flow through the DI channel. If not already activated, this can also include the I/O module 104*a*-104*b* activating the SMOD switch 408 for that channel. One or more channel diagnostics are run at step 1106. This can include, for example, the I/O module 104*a*-104*b* measuring the current flowing through the switch 402 based on measurements captured using the sense resistor 406. This can also include the I/O module 104*a*-104*b* determining whether one or more conditions are detected, such as whether the measured current is indicative of a short-circuit or open-circuit condition.

A determination is made whether all diagnostics were successful at step 1108. If so, the DI channel can be placed into normal use. During this time, current being drawn through the DI channel is read (measured) at step 1110, and one or more thresholds are applied to the measured current in order to determine a digital state of the DI channel at step 1112. This can include, for example, the I/O module 104*a*-104*b* measuring the current flowing through the switch 402 based on measurements captured using the sense resistor 406 and applying one or more thresholds to the current measurement. The determined digital state is reported to at least one controller at step 1114. This can include, for example, the I/O module 104*a*-104*b* reporting the determined digital state to one or more controllers 106*a*-106*b*. As noted above, during this time, the controller(s) 106*a*-106*b* can logically "OR" digital states received from multiple I/O modules 104*a*-104*b* to recover DI input values being sent by a field device 102. The steps 1106-1114 can be repeated any number of times here.

If not all diagnostics are successful at step 1108, all channels of the I/O module can be disconnected and a failure can be reported to at least one controller at step 1116. This can include, for example, the I/O module 104*a*-104*b* deactivating its SMOD switches 408 for all channels (possibly including a channel used to communicate its status to another I/O module 104*a*-104*b*). This can also include the I/O module 104*a*-104*b* sending an alert or other indicator identifying the failure to one or more controllers 106*a*-106*b*. As noted above, during this time, the controller(s) 106*a*-106*b* can use digital states from any remaining (non-faulty) I/O modules 104*a*-104*b* to recover DI input values being sent by a field device 102. Note that the I/O module 104*a*-104*b* may first go through a debounce process before concluding that an actual failure has occurred. A determination is made whether a user reset (or other reset indicator) has been given for the faulty I/O module at step 1118. If so, the channels of the (now restored) I/O module can be reconnected and a recovery can be reported to at least one controller at step 1120. This can include, for example, the restored I/O module 104a-104b activating its SMOD switches 408 for all channels. This can also include the I/O module 104a-104b sending an alert or other indicator identifying the recovery to one or more controllers 106a-106b. At this point, the I/O module 104a-104b can return to step 1106.

Figure 12:
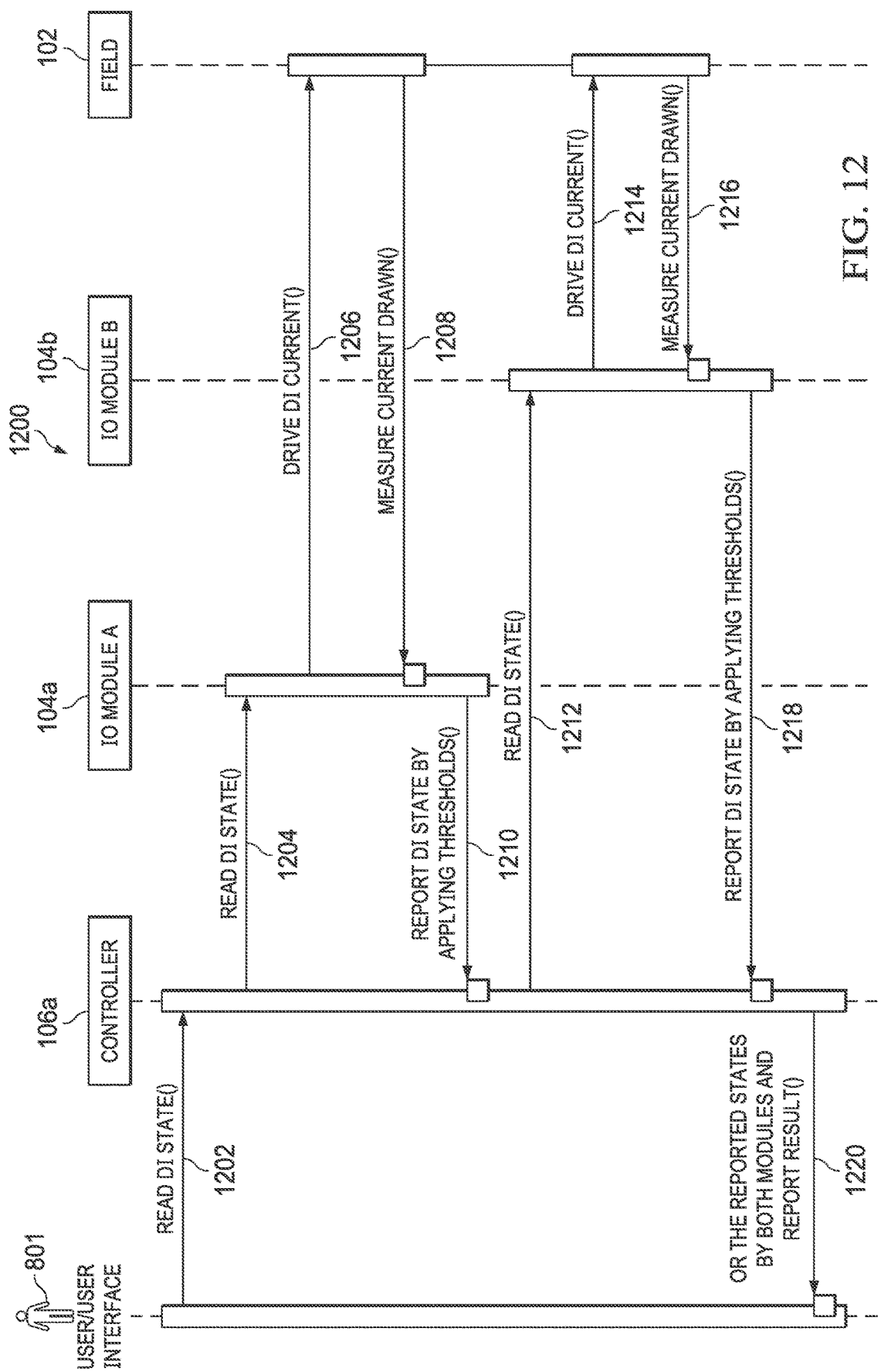
FIGS. 12 through 14 illustrate example communication flows when using a redundancy termination panel with a digital input I/O channel according to this disclosure.
Figure 13:
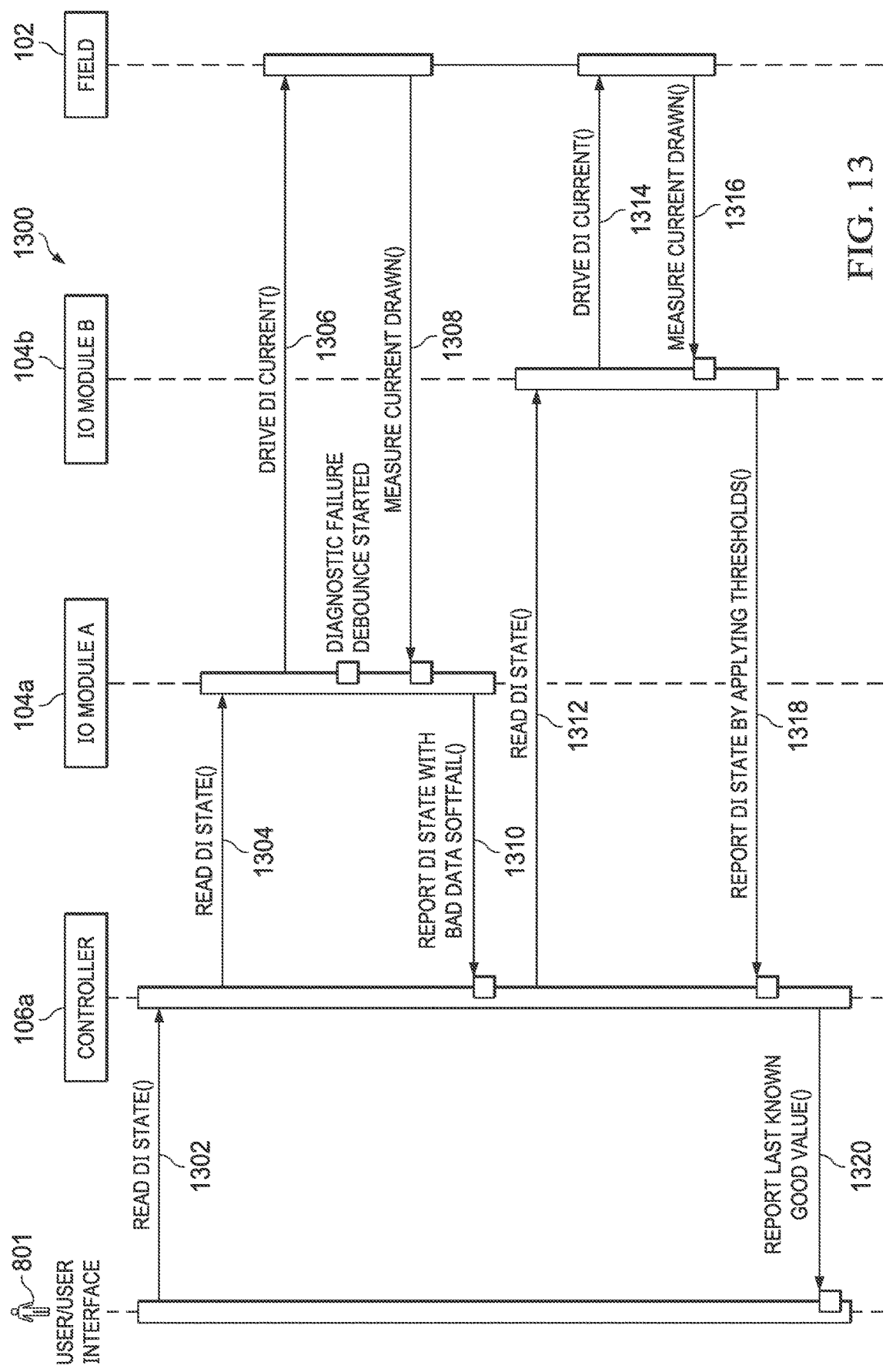
Figure 14:
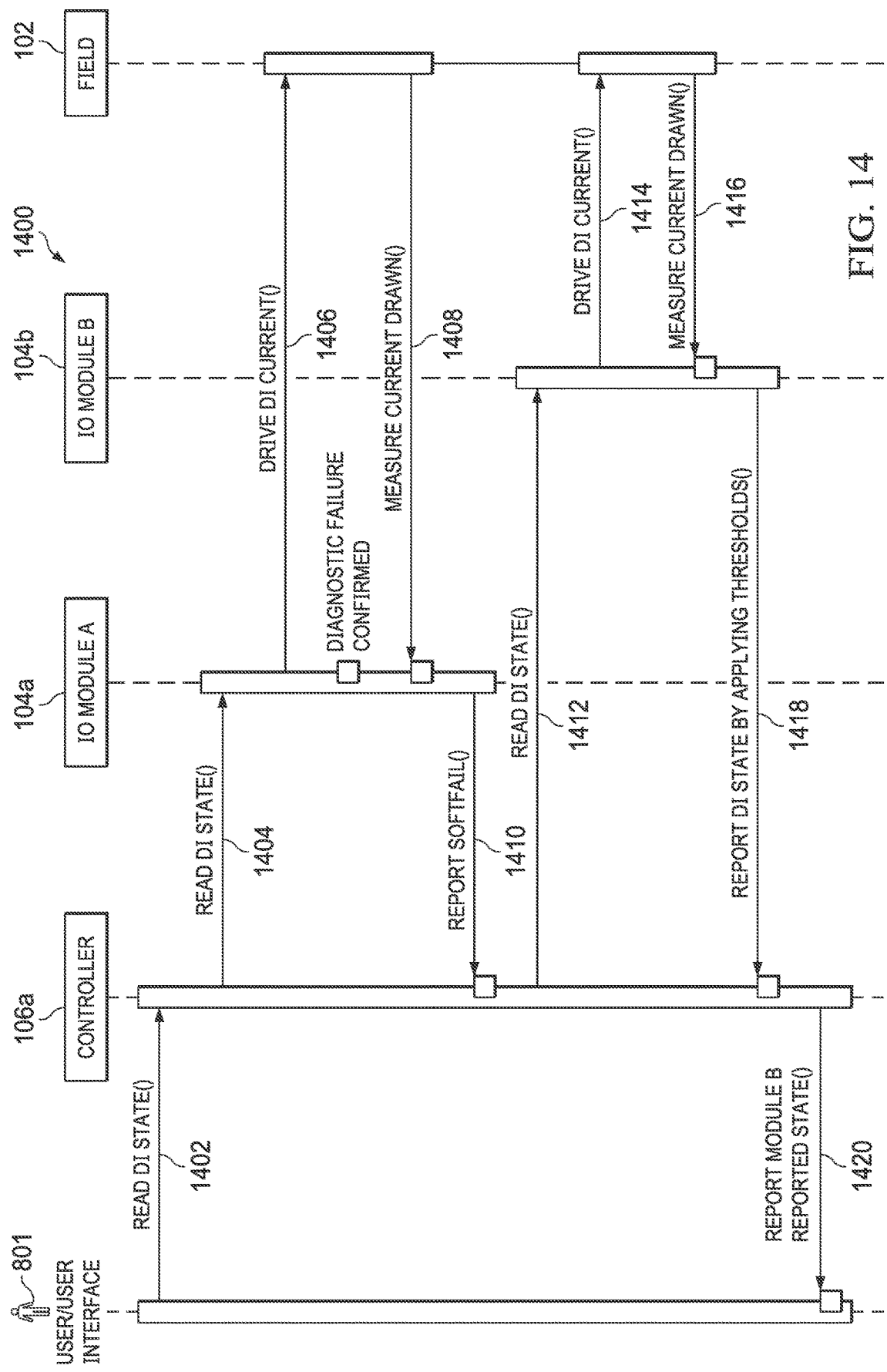

FIGS. 12 through 14 illustrate example communication flows when using a redundancy termination panel 114 with a digital input I/O channel according to this disclosure. In particular, FIG. 12 illustrates an example communication flow 1200 during normal operation of a digital input channel, FIG. 13 illustrates an example communication flow 1300 during a debounce after a potential failure of the digital input channel, and FIG. 14 illustrates an example communication flow 1400 after debouncing and after a confirmed failure of the digital input channel.

As shown in FIG. 12, during normal operation of a digital input channel, a user/user interface 801 sends a request 1202 to read a digital state of the DI channel to at least one controller (such as the controller 106a). In response, the controller 106a sends a command 1204 to read the digital state of the DI channel to the I/O module 104a, causing the I/O module 104a to drive a current 1206 to the field device 102. The I/O module 104a captures a measurement 1208 of the current drawn by the field device 102 and sends a response 1210 containing a digital state that is based on the measurement to the controller 106a. The controller 106a also sends a command 1212 to read the digital state of the DI channel to the I/O module 104b, causing the I/O module 104b to drive a current 1214 to the field device 102. The I/O module 104b captures a measurement 1216 of the current drawn by the field device 102 and sends a response 1218 containing a digital state that is based on the measurement to the controller 106a. The controller 106a combines the two digital state measurements reported by the I/O modules 104a-104b using a logical "OR" operation and sends a response 1220 containing the result to the user/user interface 801.

As shown in FIG. 13, the user/user interface 801 sends a request 1302 to read a digital state of the DI channel to at least one controller (such as the controller 106a). In response, the controller 106a sends a command 1304 to read the digital state of the DI channel to the I/O module 104a, causing the I/O module 104a to drive a current 1306 to the field device 102. In this case, however, an initial diagnostic failure occurs, meaning the I/O module 104a may or may not be able to obtain a valid measurement. Thus, the I/O module 104a captures a measurement 1308 of the current drawn by the field device 102 and sends a response 1310 containing a digital state that is based on the measurement and a "bad data softfail" indicator to the controller 106a. The "bad data softfail" indicator informs the controller 106a that a potential failure has been detected, so the I/O module 104a is entering a debounce period in which a specified amount of time needs to elapse before the I/O module 104a can determine whether an actual failure has occurred. The controller 106a also sends a command 1312 to read the digital state of the DI channel to the I/O module 104b, causing the I/O module 104b to drive a current 1314 to the field device 102. The I/O module 104b captures a measurement 1316 of the current drawn by the field device 102 and sends a response 1318 containing a digital state that is based on the measurement to the controller 106a. The controller 106a sends a response 1320 containing the last known good DI value to the user/user interface 801, which helps to prevent a possibly-invalid DI value from being provided to the user/user interface 801.

As shown in FIG. 14, the user/user interface 801 sends a request 1402 to read a digital state of the DI channel to at least one controller (such as the controller 106a). In response, the controller 106a sends a command 1404 to read the digital state of the DI channel to the I/O module 104a, causing the I/O module 104a to drive a current 1406 to the field device 102. In this case, however, the diagnostic failure is confirmed, meaning the I/O module 104a (which previously detected a potential error and started debouncing) has confirmed that a failure exists. Thus, the I/O module 104a captures a measurement 1408 of the current drawn by the field device 102 and sends a response 1410 reporting a "softfail" to the controller 106a. The softfail indicator informs the controller 106a that the I/O module 104a has failed. The controller 106a also sends a command 1412 to read the digital state of the DI channel to the I/O module 104b, causing the I/O module 104b to drive a current 1414 to the field device 102. The I/O module 104b captures a measurement 1416 of the current drawn by the field device 102 and sends a response 1418 containing a digital state that is based on the measurement to the controller 106a. The controller 106a uses the digital state reported by the I/O module 104b and sends a response 1420 containing the digital state to the user/user interface 801.

Figure 15:
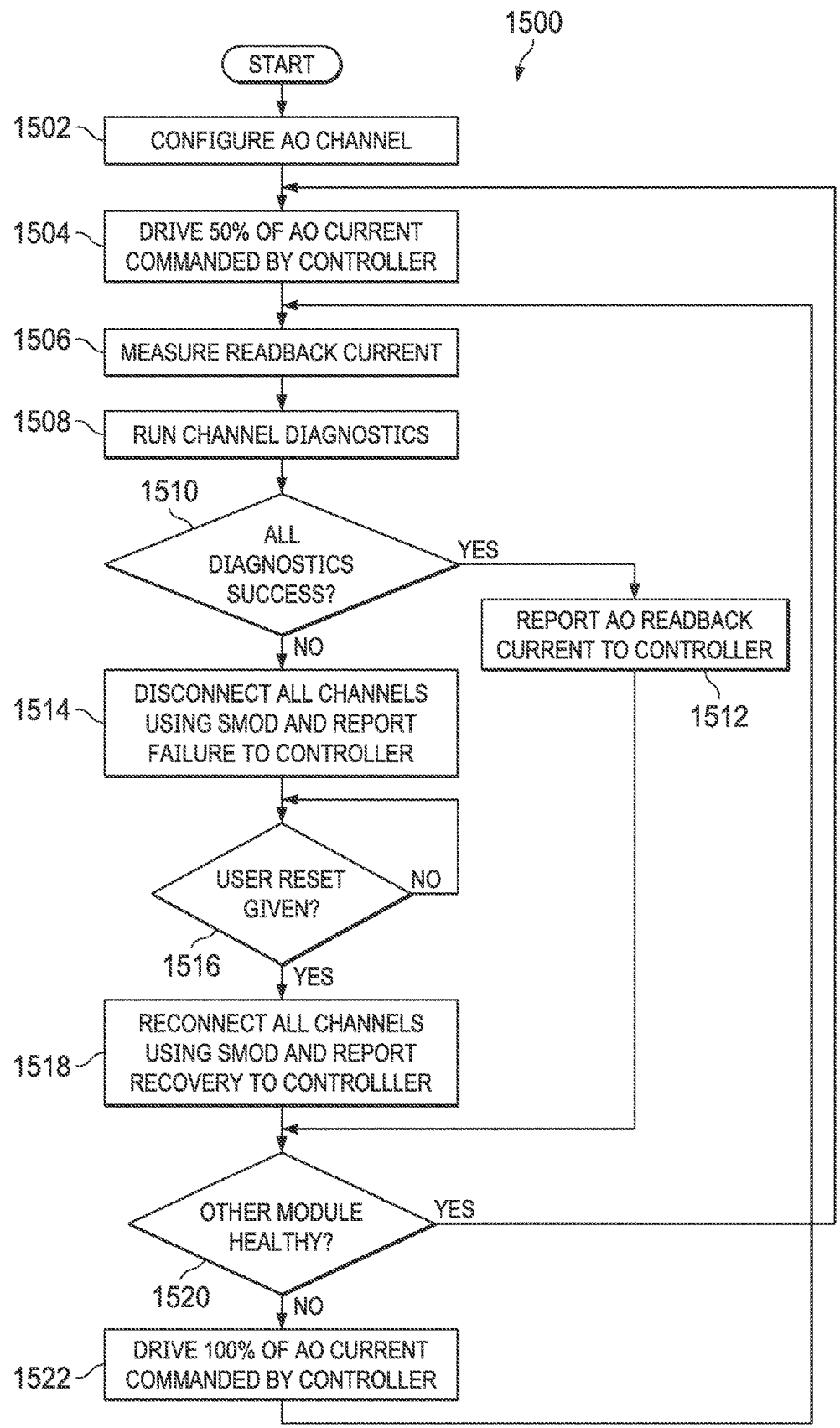
FIG. 15 illustrates an example method for supporting the use of a redundancy termination panel with an analog output I/O channel according to this disclosure.

FIG. 15 illustrates an example method 1500 for supporting the use of a redundancy termination panel 114 with an analog output I/O channel according to this disclosure. In particular, the method 1500 can be performed by each of multiple I/O modules 104a-104b to support the use of a redundant AO channel through a redundancy termination panel 114. As shown in FIG. 15, an AO channel is configured at step 1502. This can include, for example, an I/O module 104a-104b configuring a universal or reconfigurable I/O channel as an analog output channel. Alternatively, this can include personnel installing circuitry supporting an analog output channel into the I/O module 104a-104b.

A portion (such a half or some other percentage) of a drive current commanded by at least one controller is driven into the AO channel at step 1504. This can include, for example, the I/O module 104a-104b activating the switch 402 for the AO channel in order to allow the percentage of the requested drive current to flow through the AO channel. If not already activated, this can also include the I/O module 104a-104b activating the SMOD switch 408 for that channel. A readback current is measured at step 1506, and one or more channel diagnostics are run at step 1508. This can include, for example, the I/O module 104a-104b measuring a current flowing through the switch 402 based on measurements captured using the sense resistor 406. This can also include the I/O module 104a-104b determining whether one or more conditions are detected, such as whether the measured current is indicative of a short-circuit or open-circuit condition. A determination is made whether all diagnostics were successful at step 1510. If so, the readback current is reported to at least one controller at step 1512. This allows the controller(s) 106a-106b to confirm that a proper AO value was provided to a field device 102.

If not all diagnostics are successful at step 1510, all channels of the I/O module can be disconnected and a failure can be reported to at least one controller at step 1514. This can include, for example, the I/O module 104a-104b deactivating its SMOD switches 408 for all channels (possibly including a channel used to communicate its status to another I/O module 104a-104b). This can also include the I/O module 104a-104b sending an alert or other indicator identifying the failure to one or more controllers 106a-106b. As noted above, during this time, the controller(s) 106a-106b can use any remaining (non-faulty) I/O modules 104a-104b to drive AO output current being sent to a field device 102. Note that the I/O module 104a-104b may first go through a debounce process before concluding that an actual failure has occurred. A determination is made whether a user reset (or other reset indicator) has been given for the faulty I/O module at step 1516. If so, the channels of the (now restored) I/O module can be reconnected and a recovery can be reported to at least one controller at step 1518. This can include, for example, the restored I/O module 104a-104b activating its SMOD switches 408 for all channels. This can also include the I/O module 104a-104b sending an alert or other indicator identifying the recovery to one or more controllers 106a-106b.

After step 1512 or 1518, a determination is made at the I/O module whether another I/O module in a redundant set is healthy at step 1520. This can include, for example, the I/O module 104a-104b using a signal received (or not received) from the other I/O module 104a-104b to determine the health of the other I/O module. If the other I/O module remains healthy, the process returns to step 1504 so that each I/O module can continue to drive part of the current used in the AO channel. If the other I/O module is not healthy, the healthy I/O module is used to drive all of the drive current into the AO channel at step 1522. In this way, the I/O modules 104a-104b are able to collectively drive the desired amount of current into the AO channel.

Figure 16:
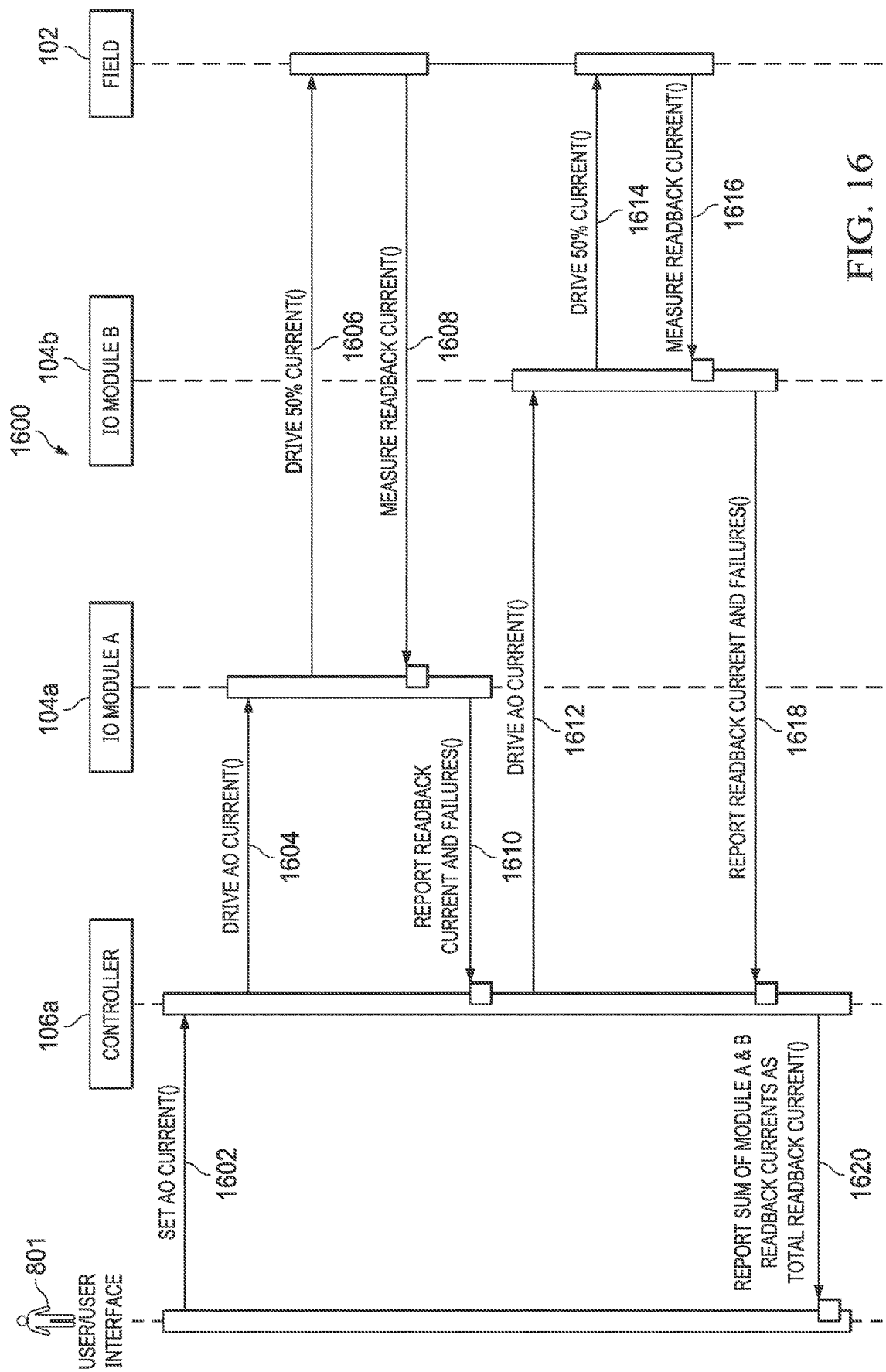
FIGS. 16 through 18 illustrate example communication flows when using a redundancy termination panel with an analog output I/O channel according to this disclosure.
Figure 17:
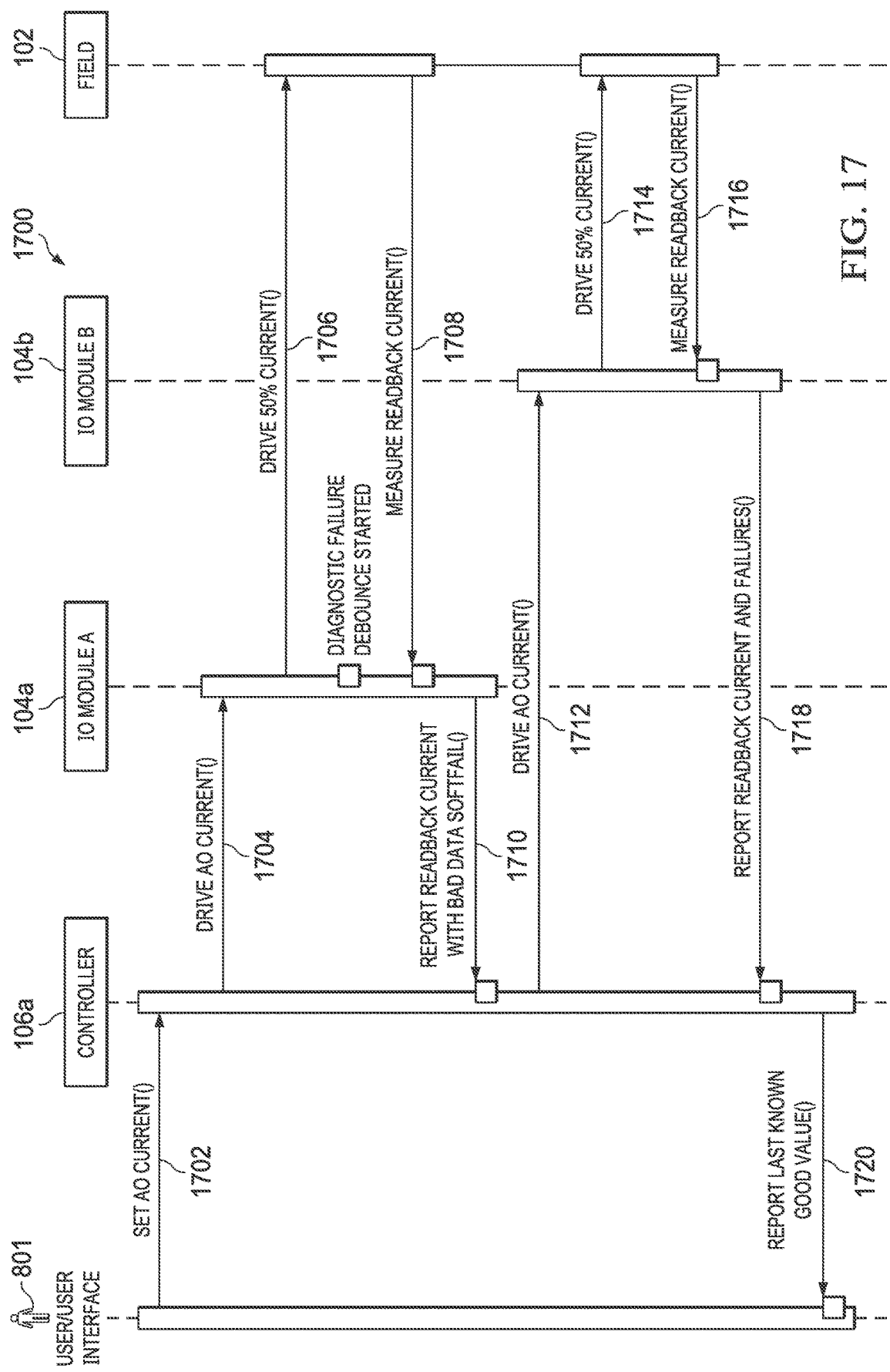
Figure 18:
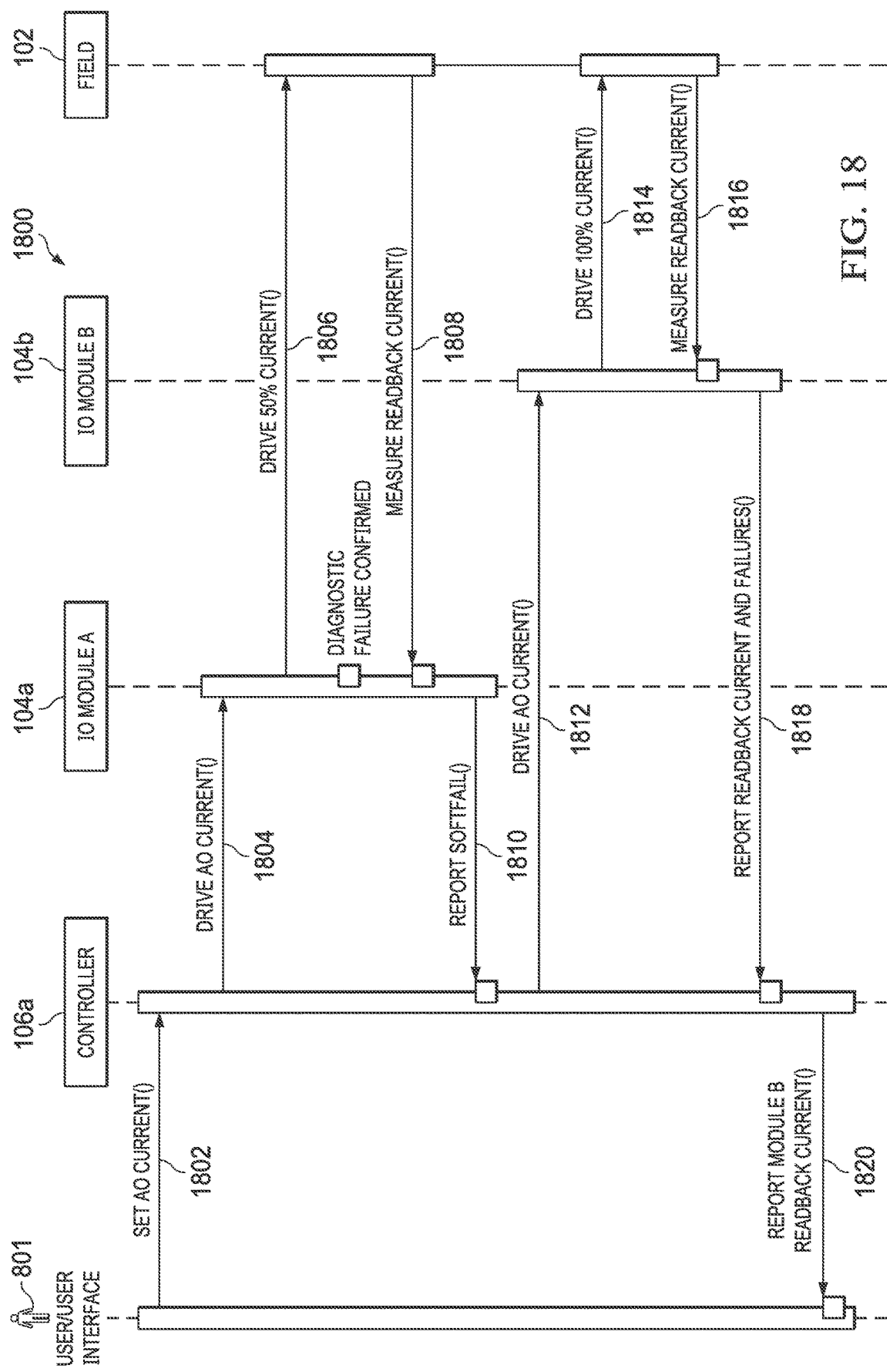

FIGS. 16 through 18 illustrate example communication flows when using a redundancy termination panel 114 with an analog output I/O channel according to this disclosure. In particular, FIG. 16 illustrates an example communication flow 1600 during normal operation of an analog output channel, FIG. 17 illustrates an example communication flow 1700 during a debounce after a potential failure of the analog output channel, and FIG. 18 illustrates an example communication flow 1800 after debouncing and after a confirmed failure of the analog output channel.

As shown in FIG. 16, during normal operation of an analog output channel, a user/user interface 801 sends a request 1602 to set a current for the AO channel to at least one controller (such as the controller 106a). In response, the controller 106a sends a command 1604 to drive the current for the AO channel to the I/O module 104a, causing the I/O module 104a to drive a current 1606 to the field device 102 that is a portion (such a half or some other percentage) of the requested current. The I/O module 104a captures a readback measurement 1608 of the current and sends a response 1610 containing the measurement to the controller 106a. The controller 106a also sends a command 1612 to drive the current for the AO channel to the I/O module 104b, causing the I/O module 104b to drive a current 1614 to the field device 102 that is a portion (such a half or some other percentage) of the requested current. The I/O module 104b captures a readback measurement 1616 of the current and sends a response 1618 containing the measurement to the controller 106a. The controller 106a sums the two current measurements reported by the I/O modules 104a-104b and sends a response 1620 containing the resulting readback sum to the user/user interface 801.

As shown in FIG. 17, the user/user interface 801 sends a request 1702 to set a current for the AO channel to at least one controller (such as the controller 106a). In response, the controller 106a sends a command 1704 to drive the current for the AO channel to the I/O module 104a, causing the I/O module 104a to drive a current 1706 to the field device 102 that is a portion (such a half or some other percentage) of the requested current. In this case, however, an initial diagnostic failure occurs, meaning the I/O module 104a may or may not be able to obtain a valid readback measurement. Thus, the I/O module 104a captures a readback measurement 1708 of the current and sends a response 1710 containing the measurement and a "bad data softfail" indicator to the controller 106a. The "bad data softfail" indicator informs the controller 106a that a potential failure has been detected, so the I/O module 104a is entering a debounce period in which a specified amount of time needs to elapse before the I/O module 104a can determine whether an actual failure has occurred. The controller 106a also sends a command 1712 to drive the current for the AO channel to the I/O module 104b, causing the I/O module 104b to drive a current 1714 to the field device 102 that is a portion (such a half or some other percentage) of the requested current. The I/O module 104b captures a readback measurement 1716 of the current and sends a response 1718 containing the measurement to the controller 106a. The controller 106a sends a response 1720 containing the last known good readback value to the user/user interface 801, which helps to prevent a possibly-invalid AO readback value from being provided to the user/user interface 801.

As shown in FIG. 18, the user/user interface 801 sends a request 1802 to set a current for the AO channel to at least one controller (such as the controller 106a). In response, the controller 106a sends a command 1804 to drive the current for the AO channel to the I/O module 104a, causing the I/O module 104a to drive a current 1806 to the field device 102 that is a portion (such a half or some other percentage) of the requested current. In this case, however, the diagnostic failure is confirmed, meaning the I/O module 104a (which previously detected a potential error and started debouncing) has confirmed that a failure exists. Thus, the I/O module 104a captures a readback measurement 1808 of the current and sends a response 1810 reporting a "softfail" to the controller 106a. The softfail indicator informs the controller 106a that the I/O module 104a has failed. The controller 106a also sends a command 1812 to drive the current for the AO channel to the I/O module 104b, causing the I/O module 104b to drive a current 1814 to the field device 102. Because the I/O module 104b can detect the failure of the I/O module 104a, the I/O module 104b can drive the entire amount of the requested current. The I/O module 104b captures a readback measurement 1816 of the current and sends a response 1818 containing the measurement to the controller 106a. The controller 106a uses the readback measurement reported by the I/O module 104b and sends a response 1820 containing the measured value to the user/user interface 801.

Figure 19:
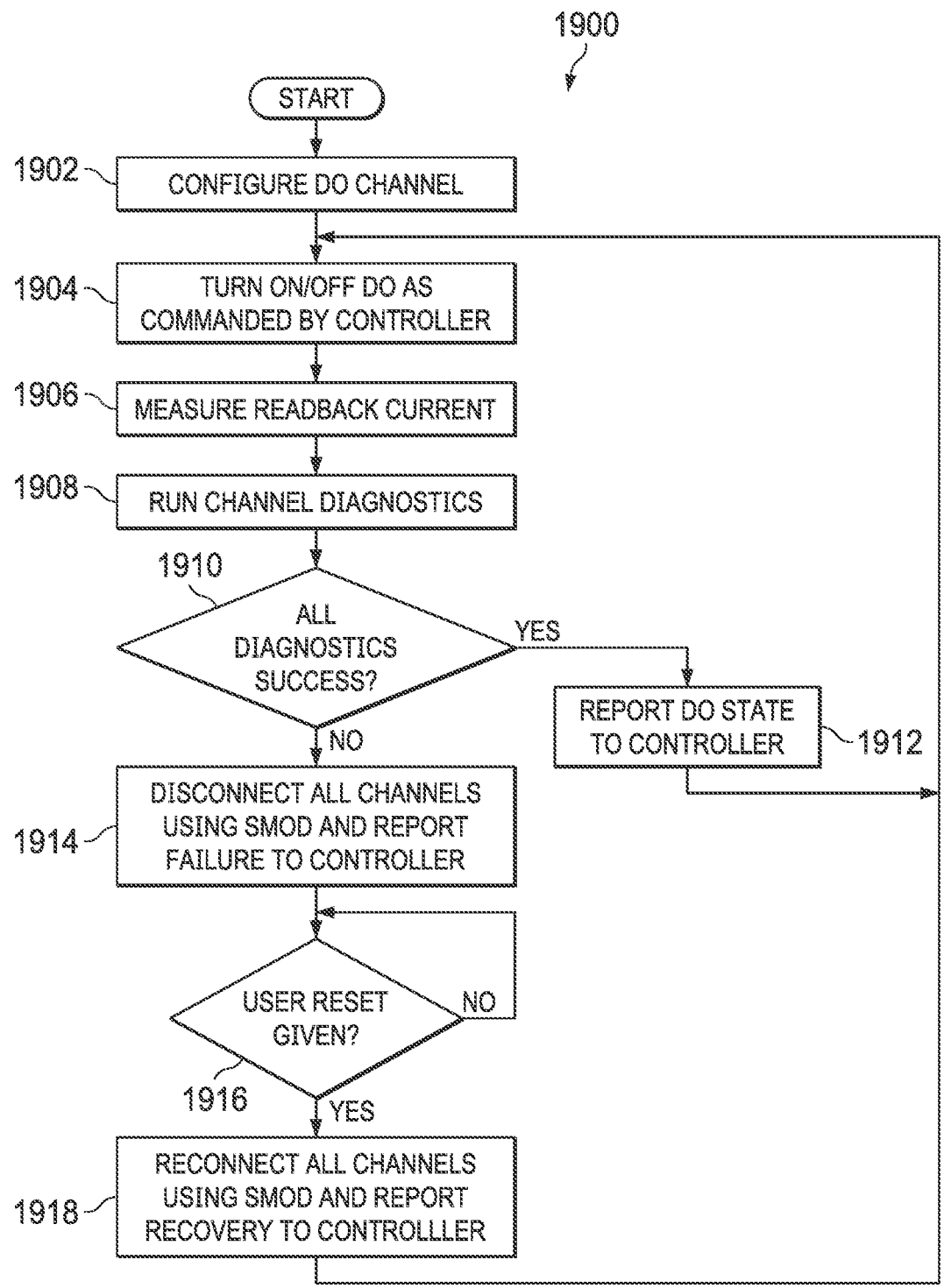
FIG. 19 illustrates an example method for supporting the use of a redundancy termination panel with a digital output I/O channel according to this disclosure.

FIG. 19 illustrates an example method 1900 for supporting the use of a redundancy termination panel 114 with a digital output I/O channel according to this disclosure. In particular, the method 1900 can be performed by each of multiple I/O modules 104a-104b to support the use of a redundant DO channel through a redundancy termination panel 114. As shown in FIG. 19, a DO channel is configured at step 1902. This can include, for example, an I/O module 104a-104b configuring a universal or reconfigurable I/O channel as a digital output channel. Alternatively, this can include personnel installing circuitry supporting a digital output channel into the I/O module 104a-104b.

The DO channel is turned on or off as commanded by at least one controller at step 1904. This can include, for example, the I/O module 104a-104b activating the switch 402 for the DO channel in order to allow current to flow through the DO channel during "on" periods and deactivating the switch 402 for the DO channel in order to block current from flowing through the DO channel during "off" periods. If not already activated, this can also include the I/O module 104a-104b activating the SMOD switch 408 for that channel as needed. A readback current is measured at step 1906, and one or more channel diagnostics are run at step 1908. This can include, for example, the I/O module 104a-104b measuring a current flowing through the switch 402 based on measurements captured using the sense resistor 406. This can also include the I/O module 104a-104b determining whether one or more conditions are detected, such as whether the measured current is indicative of a short-circuit or open-circuit condition. A determination is made whether all diagnostics were successful at step 1910. If so, the readback current is used to identify a digital state and the digital state is reported to the controller at step 1912. This allows the controller 106a-106b to confirm that a proper DO value was provided to a field device 102.

If not all diagnostics are successful at step 1910, all channels of the I/O module can be disconnected and a failure can be reported to at least one controller at step 1914. This can include, for example, the I/O module 104a-104b deactivating its SMOD switches 408 for all channels (possibly including a channel used to communicate its status to another I/O module 104a-104b). As noted above, during this time, the controller(s) 106a-106b can use any remaining (non-faulty) I/O modules 104a-104b to drive DO output current being sent to a field device 102. Note that the I/O module 104a-104b may first go through a debounce process before concluding that an actual failure has occurred. A determination is made whether a user reset (or other reset indicator) has been given for the faulty I/O module at step 1916. If so, the channels of the (now restored) I/O module can be reconnected and a recovery can be reported to at least one controller at step 1918. This can include, for example, the restored I/O module 104a-104b activating its SMOD switches 408 for all channels. This can also include the I/O module 104a-104b sending an alert or other indicator identifying the recovery to one or more controllers 106a-106b.

Figure 20:
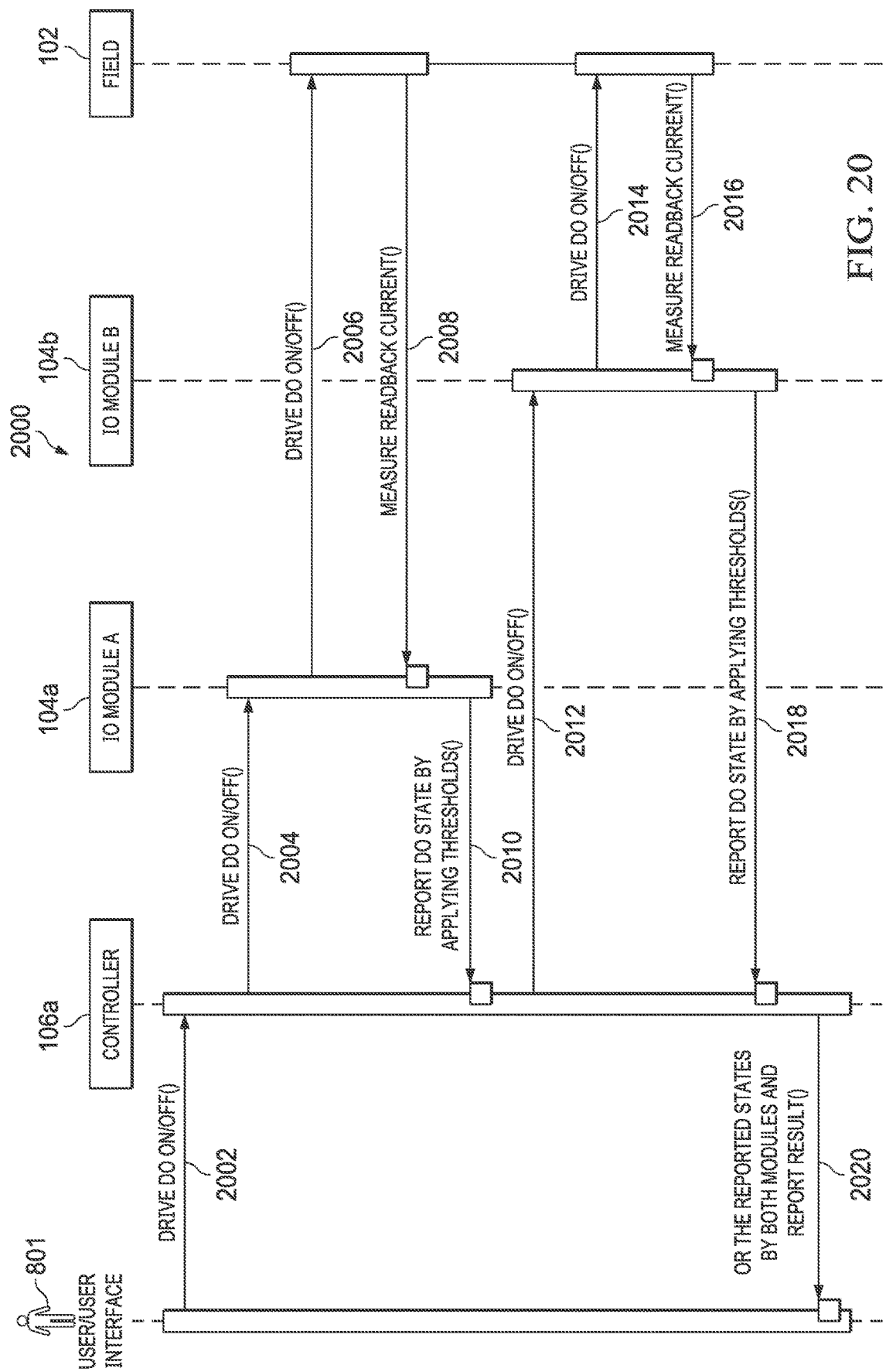
FIGS. 20 through 22 illustrate example communication flows when using a redundancy termination panel with a digital output I/O channel according to this disclosure.
Figure 21:
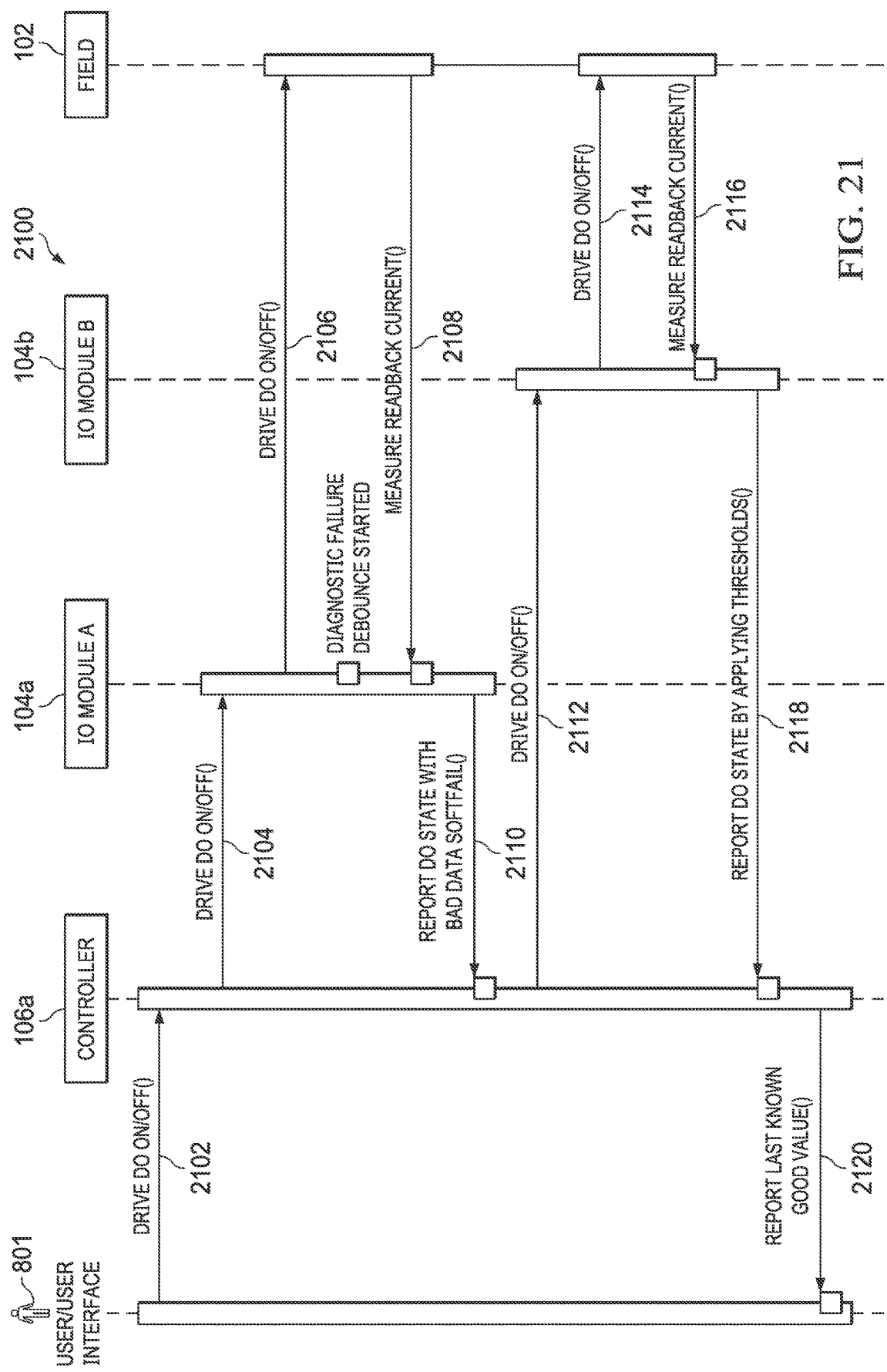
Figure 22:
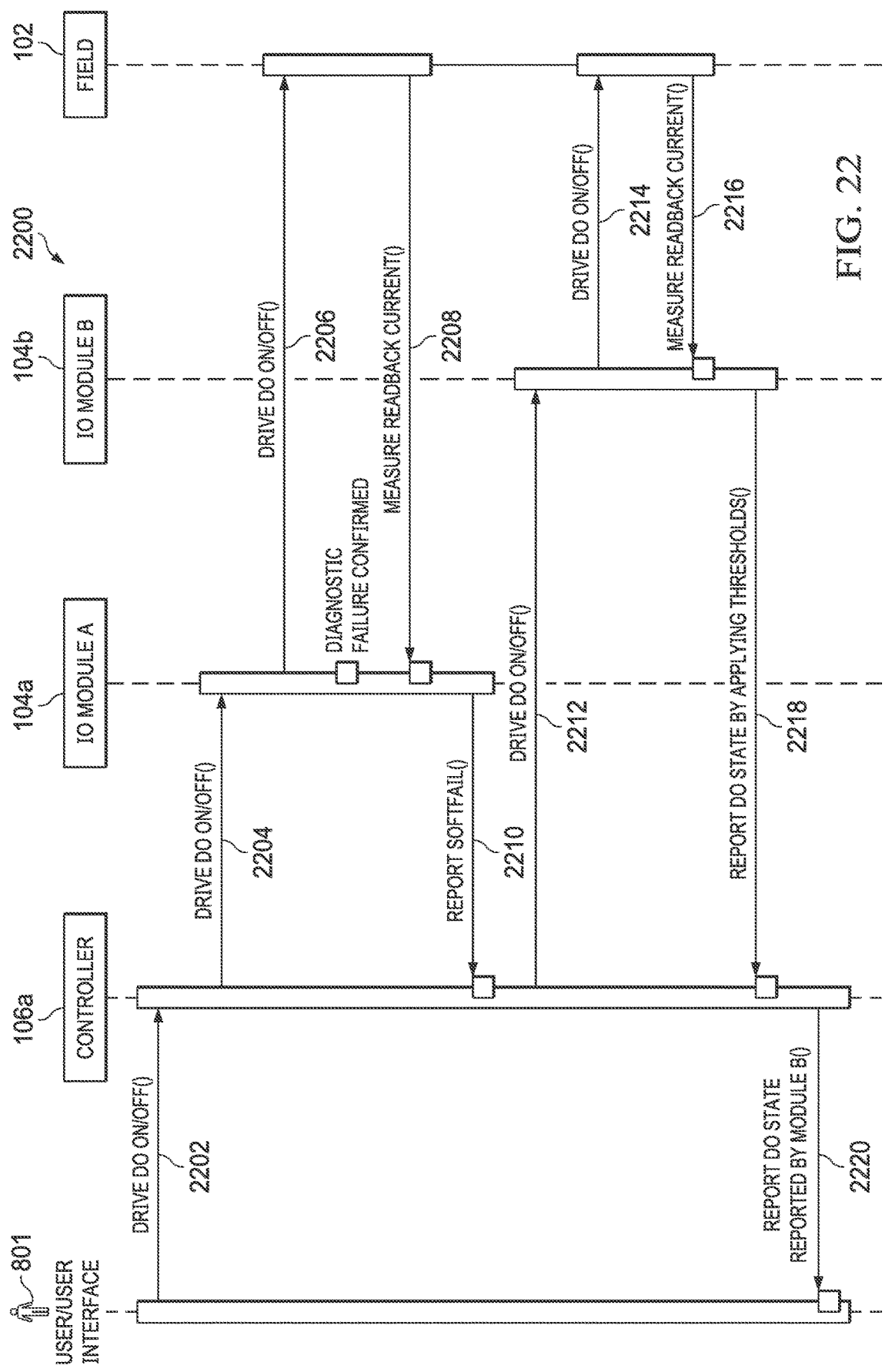

FIGS. 20 through 22 illustrate example communication flows when using a redundancy termination panel 114 with a digital output I/O channel according to this disclosure. In particular, FIG. 20 illustrates an example communication flow 2000 during normal operation of a digital output channel, FIG. 21 illustrates an example communication flow 2100 during a debounce after a potential failure of the digital output channel, and FIG. 22 illustrates an example communication flow 2200 after debouncing and after a confirmed failure of the digital output channel.

As shown in FIG. 20, during normal operation of a digital output channel, a user/user interface 801 sends a request 2002 to drive a digital state of the DO channel to at least one controller (such as the controller 106a). In response, the controller 106a sends a command 2004 to drive the digital state of the DO channel to the I/O module 104a, causing the I/O module 104a to drive a current 2006 to the field device 102 that creates the digital state. The I/O module 104a captures a readback measurement 2008 of the current and sends a response 2010 containing a digital state that is based on the measurement to the controller 106a. The controller 106a also sends a command 2012 to drive the digital state of the DO channel to the I/O module 104b, causing the I/O module 104b to drive a current 2014 to the field device 102 that creates the digital state. The I/O module 104b captures a readback measurement 2016 of the current and sends a response 2018 containing a digital state that is based on the measurement to the controller 106a. The controller 106a combines the two digital state measurements reported by the I/O modules 104a-104b using a logical "OR" operation and sends a response 1220 containing the result to the user/user interface 801.

As shown in FIG. 21, the user/user interface 801 sends a request 2102 to drive a digital state of the DO channel to at least one controller (such as the controller 106a). In response, the controller 106a sends a command 2104 to drive the digital state of the DO channel to the I/O module 104a, causing the I/O module 104a to drive a current 2106 to the field device 102. In this case, however, an initial diagnostic failure occurs, meaning the I/O module 104a may or may not be able to obtain a valid measurement. Thus, the I/O module 104a captures a readback measurement 2108 of the current and sends a response 2110 containing a digital state that is based on the measurement and a "bad data softfail" indicator to the controller 106a. The "bad data softfail" indicator informs the controller 106a that a potential failure has been detected, so the I/O module 104a is entering a debounce period in which a specified amount of time needs to elapse before the I/O module 104a can determine whether an actual failure has occurred. The controller 106a also sends a command 2112 to drive the digital state of the DO channel to the I/O module 104b, causing the I/O module 104b to drive a current 2114 to the field device 102. The I/O module 104b captures a readback measurement 2116 of the current and sends a response 2118 containing a digital state that is based on the measurement to the controller 106a. The controller 106a sends a response 2120 containing the last known good readback value to the user/user interface 801, which helps to prevent a possibly-invalid DO value from being provided to the user/user interface 801.

As shown in FIG. 22, the user/user interface 801 sends a request 2202 to drive a digital state of the DO channel to at least one controller (such as the controller 106a). In response, the controller 106a sends a command 2204 to drive the digital state of the DO channel to the I/O module 104a, causing the I/O module 104a to drive a current 2206 to the field device 102. In this case, however, the diagnostic failure is confirmed, meaning the I/O module 104a (which previously detected a potential error and started debouncing) has confirmed that a failure exists. Thus, the I/O module 104a captures a readback measurement 2208 of the current and sends a response 2210 reporting a "softfail" to the controller 106a. The softfail indicator informs the controller 106a that the I/O module 104a has failed. The controller 106a also sends a command 2212 to drive the digital state of the DO channel to the I/O module 104b, causing the I/O module 104b to drive a current 2214 to the field device 102. The I/O module 104b captures a readback measurement 2216 of the current drawn by the field device 102 and sends a response 2218 containing a digital state that is based on the measurement to the controller 106a. The controller 106a uses the digital state reported by the I/O module 104b and sends a response 2220 containing the digital state to the user/user interface 801.

Figure 23:
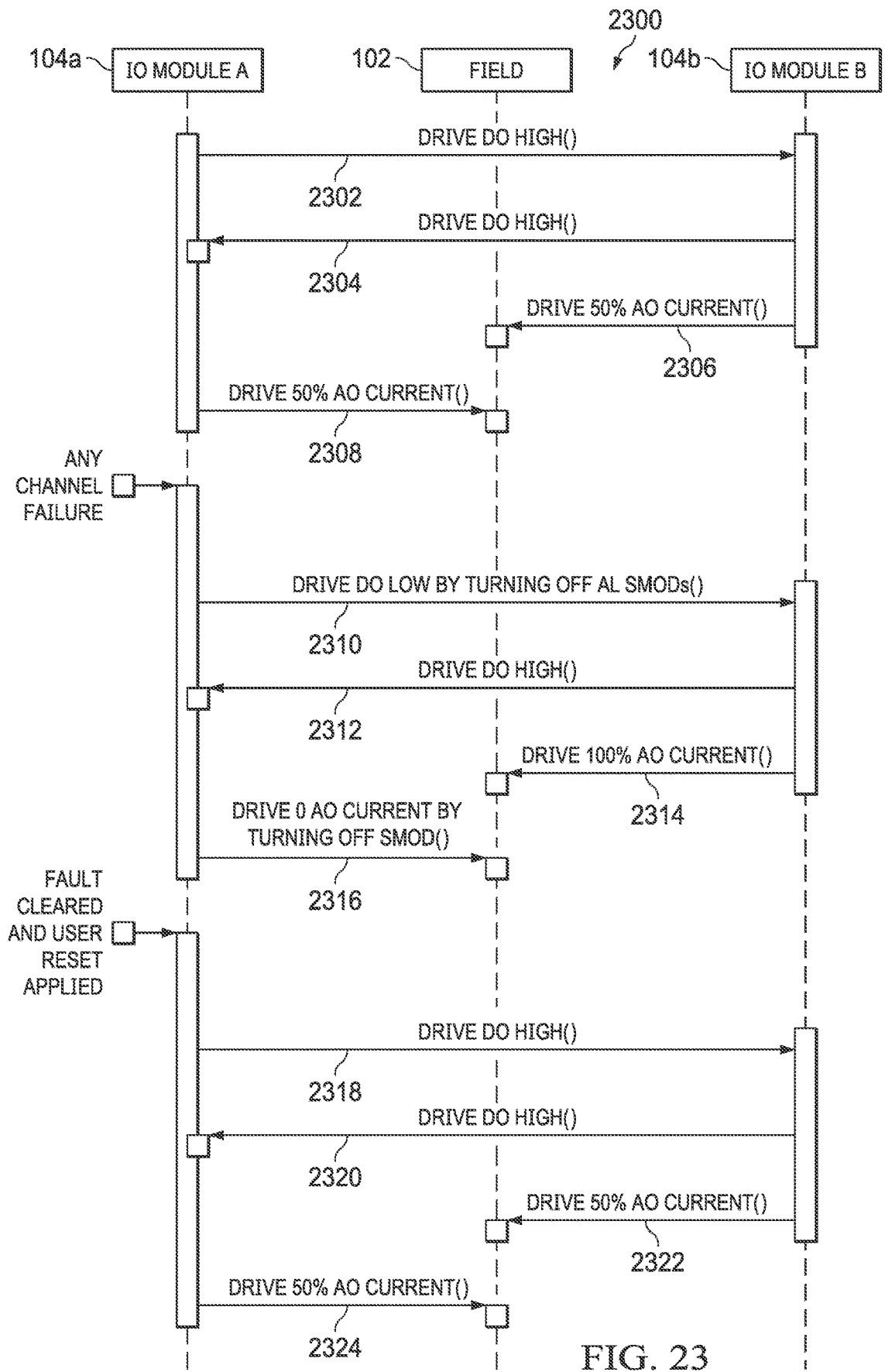
FIG. 23 illustrates example communication flows involving I/O modules that are used with a redundancy termination panel according to this disclosure.

FIG. 23 illustrates example communication flows involving I/O modules 104a-104b that are used with a redundancy termination panel 114 according to this disclosure. In particular, FIG. 23 illustrates how two I/O modules 104a-104b can communicate to support driving of an AO channel at different times. As shown in FIG. 23, when both I/O modules 104a-104b are operating properly, the I/O module 104a drives a digital output 2302 for the other I/O module 104b high, and the I/O module 104b drives a digital output 2304 for the other I/O module 104a high. These outputs 2302 and 2304 can be transported over the electrical pathways 320 and 322 or in any other suitable manner. As a result, each I/O module 104a-104b is able to identify that the other I/O module 104a-104b is healthy. The I/O module 104b therefore drives a portion (such as half) of an output current 2306 for a field device 102, and the I/O module 104a drives another portion (such as half) of an output current 2308 for the field device 102.

If the I/O module 104a fails, the I/O module 104a drives a digital output 2310 for the other I/O module 104b low (such as by deactivating the associated SMOD switch 408), while the I/O module 104b drives a digital output 2312 for the other I/O module 104a high. These outputs 2310 and 2312 can again be transported over the electrical pathways 320 and 322 or in any other suitable manner. As a result, the I/O module 104b is able to identify that the other I/O module 104a is not healthy. The I/O module 104b therefore drives all of an output current 2314 for a field device 102, and the I/O module 104a drives no output current 2316 for the field device 102.

If the I/O module 104a is restored, the I/O module 104a again drives a digital output 2318 for the other I/O module 104b high, and the I/O module 104b drives a digital output 2320 for the other I/O module 104a high. These outputs 2318 and 2320 can again be transported over the electrical pathways 320 and 322 or in any other suitable manner. As a result, each I/O module 104a-104b is able to identify that the other I/O module 104a-104b is healthy. The I/O module 104b therefore drives a portion (such as half) of an output current 2322 for a field device 102, and the I/O module 104a drives another portion (such as half) of an output current 2324 for the field device 102.

Figure 24:
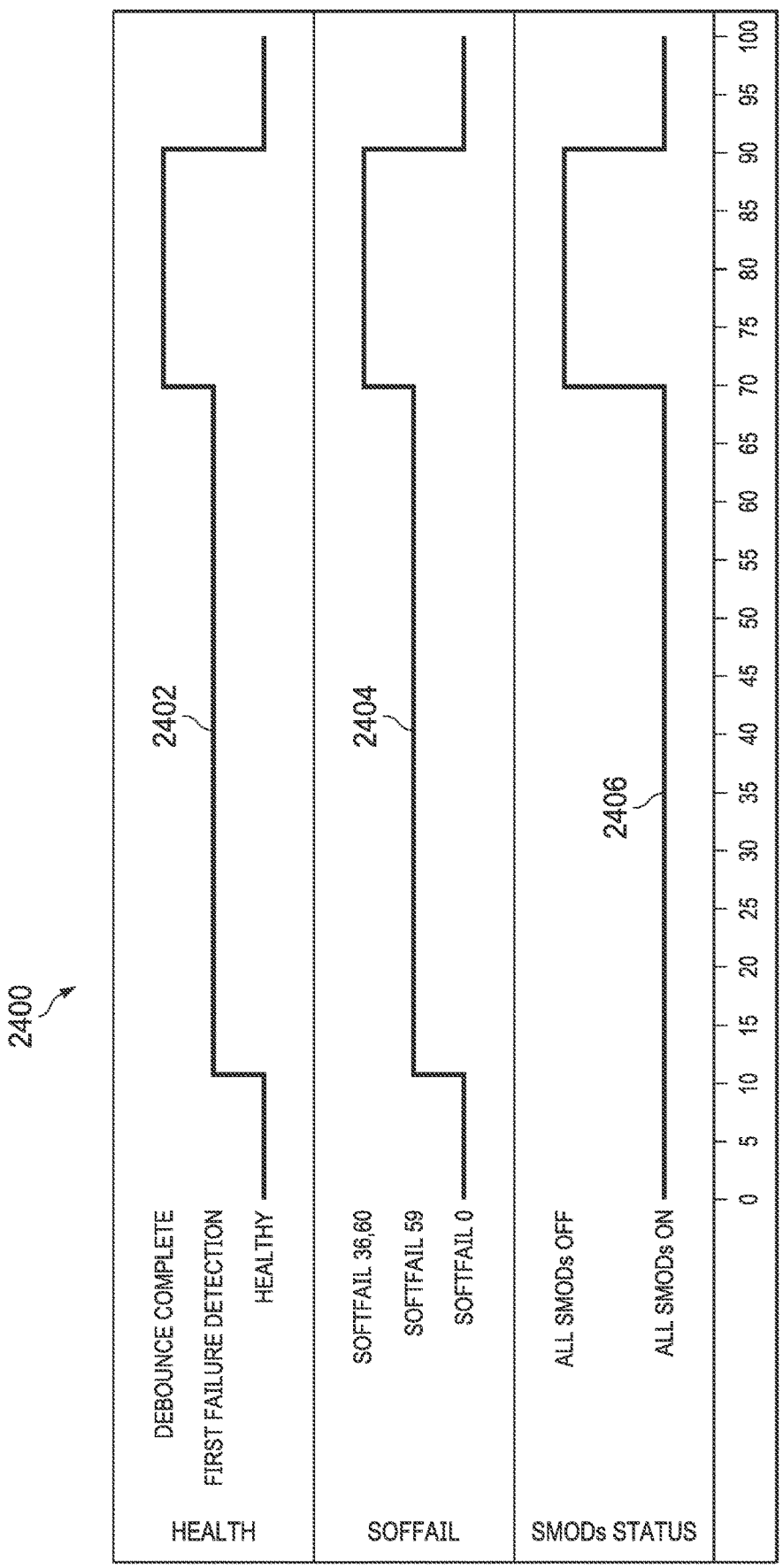
FIG. 24 illustrates an example timing of operations during a failure of one of multiple I/O modules that are used with a redundancy termination panel according to this disclosure.

FIG. 24 illustrates an example timing of operations during a failure of one of multiple I/O modules 104a-104b that are used with a redundancy termination panel 114 according to this disclosure. In particular, FIG. 24 illustrates one example of how a debounce may occur in the various methods and communication flows described above. In this example, a line 2402 represents the health of an I/O module 104a-104b, a line 2404 represents a softfail indicator output by the I/O module 104a-104b, and a line 2406 represents a status of the SMOD switches 408 in the I/O module 104a-104b.

In this example, at time 0, an I/O channel is healthy and operating normally, and the softfail value of the I/O channel can be set to "0." Assume there is a readback or other failure at a time of 10 ms. In response, a debounce time can be set to a specified value (such as 60 ms), and a softfail indicator for the I/O channel can be set to a value of "59" (which may indicate bad data). This allows at least one controller 106a-106b to hold the last good value of the I/O channel until a failure is confirmed. Between 10 ms and 70 ms, the failure is not confirmed, so the SMOD switches 408 are still activated, and a redundant I/O module has no idea of the debounce.

Once the debounce period is completed (at a time of 70 ms here), if the failure still exists for the I/O channel, the channel failure is confirmed. As a result, the softfail indicator of the failed channel can be set to "36" (which may indicate a readback test failure). Along with the failed I/O channel, the SMOD switches 408 for all other I/O channels can be deactivated, and the softfail indicators for these channels can be set to "60" (which may indicate that they were turned off due to another channel's failure). This allows at least one controller 106a-106b to ignore the values from the faulty I/O module and to use any remaining non-faulty I/O modules. Since all SMOD switches 408 of the faulty I/O module can be turned off, a non-faulty I/O module can detect the loss of a signal from the faulty I/O module (such as is described above with respect to FIG. 23), allowing the non-faulty I/O module to fully drive any AO signals as described above.

Although FIGS. 7 through 24 illustrate examples of methods and communication flows involving a redundancy termination panel or components used in conjunction with a redundancy termination panel, various changes may be made to FIGS. 7 through 24. For example, while the methods 700, 1100, 1500, and 1900 are each shown as a series of steps, various steps in each method may overlap, occur in parallel, occur in a different order, or occur any number of times. Also, while a user or user interface 801 is shown as being involved in various communication flows, the user or user interface 801 may be replaced by any automated component or other component that communicates via at least one I/O channel. In addition, while specific times and indicator values are discussed above with respect to FIG. 24, these times and indicator values are for illustration only.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A redundancy termination panel comprising:
   first and second interfaces configured to be coupled to first and second input/output (I/O) modules, respectively;
   a third interface configured to be coupled to a field device; and
   an I/O channel circuit associated with an I/O channel between the I/O modules and the field device, wherein the I/O channel circuit is configured to:
      allow an input current used for receiving data from the field device to be split such that different portions of the input current are sourced by different ones of the I/O modules; and
      combine multiple currents driven by different ones of the I/O modules and provide an output current used for sending data to the field device.

2. The redundancy termination panel of claim 1, wherein the I/O channel circuit comprises:
   one or more first diodes coupled between the first interface and the third interface; and
   one or more second diodes coupled between the second interface and the third interface;
   wherein one of the one or more first diodes and one of the one or more second diodes are coupled together.

3. The redundancy termination panel of claim 1, further comprising:
   at least one electrical pathway coupled to the first and second interfaces, the at least one electrical pathway configured to allow communication between the first and second I/O modules.

4. The redundancy termination panel of claim 1, further comprising:
   a power supply interface configured to be coupled to at least one power supply, the power supply interface coupled to the first and second interfaces.

5. The redundancy termination panel of claim 1, wherein:
   the third interface is configured to be coupled to multiple field devices; and
   the redundancy termination panel comprises multiple I/O channel circuits associated with multiple I/O channels between the I/O modules and the field devices.

6. The redundancy termination panel of claim 1, wherein the I/O channel circuit is further configured, upon a failure of the first I/O module, to:
   allow the input current to be sourced entirely by the second I/O module and provided to the field device; and
   provide a single current driven entirely by the second I/O module to the field device as the output current.

7. A method comprising:
   coupling first and second interfaces of a redundancy termination panel to first and second input/output (I/O) modules, respectively;
   coupling a third interface of the redundancy termination panel to a field device; and
   operating an I/O channel circuit associated with an I/O channel between the I/O modules and the field device, the I/O channel circuit configured to:
      allow an input current used for receiving data from the field device to be split such that different portions of the input current are sourced by different ones of the I/O modules; and
      combine multiple currents driven by different ones of the I/O modules and provide an output current used for sending data to the field device.

8. The method of claim 7, further comprising:
   using at least one electrical pathway of the redundancy termination panel coupled to the first and second interfaces to allow communication between the first and second I/O modules.

9. The method of claim 7, wherein:
   the third interface is configured to be coupled to multiple field devices; and
   the method comprises operating multiple I/O channel circuits associated with multiple I/O channels between the I/O modules and the field devices.

10. The method of claim 7, wherein the I/O channel circuit is further configured, upon a failure of the first I/O module, to:
    allow the input current to be sourced entirely by the second I/O module and provided to the field device; and
    provide a single current driven entirely by the second I/O module to the field device as the output current.

11. A system comprising:
    first and second input/output (I/O) modules each configured to communicate with one or more field devices over one or more I/O channels; and
    a redundancy termination panel comprising:
       first and second interfaces configured to be coupled to the first and second I/O modules, respectively;
       a third interface configured to be coupled to the one or more field devices; and
       one or more I/O channel circuits associated with the one or more I/O channels, wherein each I/O channel circuit is configured to:
          allow an input current used for receiving data from one of the one or more field devices to be split such that different portions of the input current are sourced by different ones of the I/O modules; and
          combine multiple currents driven by different ones of the I/O modules and provide an output current used for sending data to one of the one or more field devices.

12. The system of claim 11, wherein, for each I/O channel comprising an analog input channel, each of the first and second I/O modules is configured to source a portion of an input current associated with an analog value and to measure the portion of the input current associated with the analog value.

13. The system of claim 12, wherein each I/O module is further configured, upon a failure of the other I/O module, to source all of the input current associated with the analog value and to measure the input current associated with the analog value.

14. The system of claim 11, wherein, for each I/O channel comprising a digital input channel, each of the first and second I/O modules is configured to source an input current associated with a digital state.

15. The system of claim 11, wherein, for each I/O channel comprising an analog output channel, each of the first and second I/O modules is configured to drive half of an output current associated with an analog value.

16. The system of claim 15, wherein each I/O module is further configured, upon a failure of the other I/O module, to drive all of the output current associated with the analog value.

17. The system of claim 11, wherein, for each I/O channel comprising a digital output channel, each of the first and second I/O modules is configured to drive an output current associated with a digital state.

18. The system of claim 11, further comprising a process controller configured to:

for each I/O channel comprising an analog input channel, receive and sum measured portions of the input current from the first and second I/O modules to generate an analog input value;

for each I/O channel comprising a digital input channel, receive and logically "OR" digital states from the first and second I/O modules to generate a digital input value;

for each I/O channel comprising an analog output channel, receive and sum measured portions of the output current from the first and second I/O modules to generate an analog output value; and for each I/O channel comprising a digital output channel, receive and logically "OR" readback digital states from the first and second I/O modules to generate a digital output value.

19. The system of claim 11, wherein each I/O channel circuit comprises:

one or more first diodes coupled between the first interface and the third interface; and one or more second diodes coupled between the second interface and the third interface; and wherein one of the one or more first diodes and one of the one or more second diodes are coupled together.

20. The system of claim 11, wherein the redundancy termination panel further comprises:

at least one electrical pathway coupled to the first and second interfaces, the at least one electrical pathway configured to allow communication between the first and second I/O modules.

* * * * *